United States Patent
Zurecki et al.

(10) Patent No.: US 7,637,187 B2
(45) Date of Patent: Dec. 29, 2009

(54) APPARATUS AND METHOD OF CRYOGENIC COOLING FOR HIGH-ENERGY CUTTING OPERATIONS

(75) Inventors: Zbigniew Zurecki, Macungie, PA (US); Robert Bruce Swan, Bath, PA (US); John Herbert Frey, Allentown, PA (US); George Matthew Harriott, Allentown, PA (US); Xiaoguang Zhang, Macungie, PA (US)

(73) Assignee: Air Products & Chemicals, Inc., Allentown, PA (US)

( * ) Notice: Subject to any disclaimer, the term of this patent is extended or adjusted under 35 U.S.C. 154(b) by 0 days.

(21) Appl. No.: 10/488,854

(22) PCT Filed: Aug. 29, 2002

(86) PCT No.: PCT/US02/27548

§ 371 (c)(1),
(2), (4) Date: Mar. 5, 2004

(87) PCT Pub. No.: WO03/022517

PCT Pub. Date: Mar. 20, 2003

(65) Prior Publication Data

US 2005/0011201 A1    Jan. 20, 2005

(51) Int. Cl.
*B23B 27/10* (2006.01)
*B23B 27/00* (2006.01)

(52) U.S. Cl. .............. 82/1.11; 82/50; 407/11

(58) Field of Classification Search ........... 82/1.11, 82/50, 901; 407/11, 56, 100
See application file for complete search history.

(56) References Cited

U.S. PATENT DOCUMENTS

| 2,635,399 | A |   | 4/1953  | West, Jr.         |        |
|-----------|---|---|---------|-------------------|--------|
| 2,641,047 | A |   | 6/1953  | Jackman et al.    |        |
| 3,077,802 | A | * | 2/1963  | Philip            | 82/173 |
| 3,433,028 | A |   | 3/1969  | Klee              |        |
| 3,571,877 | A | * | 3/1971  | Zerkle            | 407/11 |
| 3,650,337 | A |   | 3/1972  | Andrews et al.    |        |
| 3,696,627 | A |   | 10/1972 | Longsworth        |        |

(Continued)

FOREIGN PATENT DOCUMENTS

CN        87102713        4/1988

(Continued)

OTHER PUBLICATIONS

U.S. Appl. No. 09/870,853, filed May 31, 2001, Zurecki, Zbigniew et al.

(Continued)

*Primary Examiner*—Will Fridie, Jr.
(74) *Attorney, Agent, or Firm*—Caesar Rivise Bernstein Cohen & Pokotilow, Ltd.

(57) ABSTRACT

A cryogenic fluid jet is used in an apparatus and a method for remote cooling of a cutting tool engaged in machining a workpiece under high-energy conditions, such as high-speed machining, hard-turning, cutting of difficult to machine materials, and combinations thereof. The apparatus and method use a stabilized, free-expanding cryogenic fluid jet having a pulse cycle time less than or equal to about 10 seconds. The apparatus and method increase the cleanliness of machined parts and chips and machining productivity of hard but brittle tools, including but not limited to tools which should not be cooled with conventional cooling fluids.

36 Claims, 11 Drawing Sheets

U.S. PATENT DOCUMENTS

| | | | |
|---|---|---|---|
| 3,751,780 A | | 8/1973 | Villalobos |
| 3,889,520 A | | 6/1975 | Stoferle et al. |
| 3,900,975 A | | 8/1975 | Lightstone et al. |
| 3,971,114 A | * | 7/1976 | Dudley .................. 407/120 |
| 3,979,981 A | | 9/1976 | Lightstone et al. |
| 4,083,220 A | | 4/1978 | Kobayashi et al. |
| 4,296,610 A | | 10/1981 | Davis |
| 4,336,689 A | | 6/1982 | Davis |
| 4,404,827 A | | 9/1983 | Van den Sype |
| 4,510,760 A | | 4/1985 | Wieland |
| 4,547,470 A | | 10/1985 | Tanase et al. |
| 4,666,665 A | | 5/1987 | Hornsby et al. |
| 4,715,187 A | | 12/1987 | Stearns |
| 4,716,738 A | | 1/1988 | Tatge et al. |
| 4,788,842 A | | 12/1988 | Kopp et al. |
| 4,829,859 A | | 5/1989 | Yankoff et al. |
| 4,829,869 A | | 5/1989 | Katada et al. |
| 4,844,047 A | | 7/1989 | Brehm et al. |
| 4,848,198 A | | 7/1989 | Royal et al. |
| 5,025,547 A | | 6/1991 | Sheu et al. |
| 5,103,701 A | | 4/1992 | Lundin et al. |
| 5,123,250 A | | 6/1992 | Maric |
| 5,237,894 A | | 8/1993 | Lindeke |
| 5,265,505 A | | 11/1993 | Frechette |
| 5,392,608 A | | 2/1995 | Lee |
| 5,432,132 A | | 7/1995 | Dasgupta et al. |
| 5,449,647 A | | 9/1995 | Brandt |
| 5,477,691 A | | 12/1995 | White |
| 5,509,335 A | | 4/1996 | Emerson |
| 5,592,863 A | * | 1/1997 | Jaskowiak et al. ........... 82/1.11 |
| 5,597,272 A | | 1/1997 | Moriguchi |
| 5,716,974 A | | 2/1998 | Camaggi et al. |
| 5,738,281 A | | 4/1998 | Zurecki et al. |
| 5,761,941 A | | 6/1998 | Matsui et al. |
| 5,761,974 A | | 6/1998 | Wang et al. |
| 5,762,381 A | | 6/1998 | Vogel et al. |
| 5,799,553 A | * | 9/1998 | Billatos ................. 82/1.11 |
| 5,862,833 A | | 1/1999 | Perez |
| 5,878,496 A | | 3/1999 | Liu et al. |
| 5,901,623 A | * | 5/1999 | Hong .................... 82/50 |
| 6,010,283 A | | 1/2000 | Henrich et al. |
| 6,017,172 A | | 1/2000 | Ukegawa et al. |
| 6,053,669 A | * | 4/2000 | Lagerberg ............... 407/11 |
| 6,105,374 A | | 8/2000 | Kamody |
| 6,145,322 A | | 11/2000 | Odashima |
| 6,179,692 B1 | | 1/2001 | Hara |
| 6,200,198 B1 | | 3/2001 | Ukai et al. |
| 6,202,525 B1 | | 3/2001 | Hendrickson et al. |
| 6,305,183 B1 | | 10/2001 | Mukai et al. |
| 6,330,818 B1 | | 12/2001 | Jain |
| 6,332,385 B1 | | 12/2001 | Kautto et al. |
| 6,360,577 B2 | | 3/2002 | Austin |
| 6,454,877 B1 | | 9/2002 | Kumar et al. |
| 6,513,336 B2 | | 2/2003 | Zurecki et al. |
| 6,564,682 B1 | | 5/2003 | Zurecki et al. |
| 6,622,570 B1 | | 9/2003 | Prevey, III |
| 6,652,200 B2 | | 11/2003 | Kraemer |
| 6,658,907 B2 | | 12/2003 | Inoue et al. |
| 6,666,061 B2 | | 12/2003 | Heimann |
| 6,675,622 B2 | | 1/2004 | Plicht et al. |
| 6,815,362 B1 | | 11/2004 | Wong et al. |
| 2002/0040905 A1 | | 4/2002 | Groll |
| 2002/0150496 A1 | | 10/2002 | Chandrasekar et al. |
| 2002/0174528 A1 | | 11/2002 | Prevey, III |
| 2002/0189413 A1 | | 12/2002 | Zurecki et al. |
| 2003/0110781 A1 | | 6/2003 | Zurecki et al. |
| 2003/0145694 A1 | | 8/2003 | Zurecki et al. |
| 2004/0043626 A1 | | 3/2004 | Chou San et al. |
| 2004/0154443 A1 | | 8/2004 | Zurecki et al. |
| 2004/0232258 A1 | | 11/2004 | Cerv et al. |
| 2004/0234350 A1 | | 11/2004 | Jager et al. |
| 2004/0237542 A1 | | 12/2004 | Zurecki et al. |
| 2005/0011201 A1 | | 1/2005 | Zurecki et al. |
| 2005/0016337 A1 | | 1/2005 | Zurecki et al. |
| 2005/0211029 A1 | | 9/2005 | Zurecki et al. |
| 2007/0175255 A1 | | 8/2007 | Pawelski et al. |

FOREIGN PATENT DOCUMENTS

| | | |
|---|---|---|
| DE | 4326517 A1 | 8/1993 |
| DE | 4326517 A | 2/1995 |
| DE | 19600172 A1 | 8/1997 |
| DE | 19730539 C1 | 4/1999 |
| EP | 0842722 A1 | 5/1998 |
| EP | 0711663 B1 | 7/1999 |
| EP | 0945222 A2 | 9/1999 |
| EP | 1580284 A2 | 9/2005 |
| EP | 1637257 A1 | 3/2006 |
| FR | 2724337 A | 3/1996 |
| FR | 2724337 A1 | 3/1996 |
| FR | 2804492 A | 8/2001 |
| FR | 2804492 A1 | 8/2001 |
| GB | 784504 A | 10/1957 |
| GB | 1546590 A | 5/1979 |
| JP | 328397 | 11/1953 |
| JP | 6210105 | 1/1987 |
| JP | 63-62637 | 12/1988 |
| JP | 5-508114 A | 11/1993 |
| JP | 6031502 A1 | 2/1994 |
| JP | 6330077 A2 | 11/1994 |
| JP | 09-300172 | 11/1997 |
| JP | 9-300172 A | 11/1997 |
| JP | 09300172 A | 11/1997 |
| JP | 11320328 A1 | 11/1999 |
| JP | 2000-65291 A1 | 3/2000 |
| JP | 2000210837 A | 8/2000 |
| JP | 2000-296438 A1 | 10/2000 |
| JP | 2002-59336 A | 2/2002 |
| JP | 2002059336 | 2/2002 |
| JP | 11156669 A1 | 12/2007 |
| WO | 92/16464 A1 | 10/1992 |
| WO | WO 92/17315 | 10/1992 |
| WO | 9708486 | 3/1997 |
| WO | 98/10893 A1 | 3/1998 |
| WO | WO 9960079 A | 11/1999 |
| WO | 0296598 | 5/2002 |
| WO | WO 02096598 A | 12/2002 |
| WO | 03/002277 A1 | 1/2003 |
| WO | 03022517 | 3/2003 |
| WO | 03066916 | 8/2003 |
| WO | 2005/120739 A1 | 12/2005 |

OTHER PUBLICATIONS

U.S. Appl. No. 10/066,830, filed Feb. 4, 2002, Zurecki, Zbigniew et al.

U.S. Appl. No. 09/951,195, filed Sep. 13, 2001, Zurecki, Zbigniew et al.

U.S. Appl. No. 10/809,773, filed Mar. 25, 2004, Zurecki, Zbigniew et al.

U.S. Appl. No. 11/221,718, filed Sep. 9, 2005, Ghosh, Ranajit, et al.

U.S. Appl. No. 11/250,346, filed Oct. 14, 2005, Zurecki, Zbigniew et al.

U.S. Appl. No. 09/870,853, filed May 31, 2001, Zurecki, et al.

Hong, Shane Y., et al., Micro-temperature Manipulation in Cryogenic Machining of Low Carbon Steel, Elsevier Journal of Materials Processing Technology 116 (2001) pp. 22-30.

"Mechanical Engineering Handbook (2nd Edition)", Editorial Board of Mechanical Engineering Handbook and Electrical Engineering Handbook, p. 1-16, 1-30, 4-3 and 2-41, China Machine Press.

D'Errico et al. "Performance of Ceramic Cutting Tools in Turning Operations," Industrial Ceramics, vol. 17, 1997, pp. 80-83.

Edwards, Cutting Tools 1993, The Institute of Materials, London, p. 20.

"Machining," Metals Handbook 9th Edition, vol. 16, 1996.

Gunnberg, F., "Surface Integrity of Hard Turned PM Steel," Thesis Dept. of Product Development, Chalmers University of Technology, 412 96 Goteborg, Sweden, 2003.

Orlowicz, et al., "Effect of Rapid Solidification on Sliding Wear of Iron Castings", Wear 254 (2003), pp. 154-163.

Majumdar, et al., "Laser Surface Alloying—An Advanced Surface Modification Technology", Department of Metallurgical and Materials Engineering Indian Institute of Technology, Kharagpur-721302, India, I. W. W., Technical University of Clausthal, D-38678 Clausthal Zellerfield, Germany, pp. 1-11.

"White Layer Formation at Machined Surfaces and . . . ," B.J. Griffins, J. of Tribology, vol. 107/165, Apr. 1985.

"Machining Hard Materials with Geometrically . . . ," W. Konig, et al, Annals of CIRP, vol. 57, 1990.

"Potential and Limitations of Hard Turning . . . ," H.K. Tonshoff, et al, 1st Int. Machining and Grinding Conf. 1995.

"PCBN Tool Failure Mode Analysis," T.J. Broskea, Intertech 2000.

"Process Effects on White Layer Formation in Hard Turning," Y.K. Chou, et al, NAMRI/SME, 1998.

Biomedical Instrumentation and Tech., "Development of a High-Performance Multiprobe Cryosurgical Device", Chang, et al, 1994.

Thiele, et al., "Effect of Cutting Edge Geometry and Workpiece Hardness on Surface Generation in the finish Hard Turning of AISI 52100 Steel", Journal of Materials Processing Technology, 94 (1999), pp. 216-226.

Ozel, et al., "Effects of Cutting Edge Geometry, Workpiece Hardness, Feed Rate and Cutting Speed on Surface Roughness and Forces in Finish Turning of Hardened AISI H13 Steel", Department of Industrial and Systems Engineering, Rutgers, The State University of New Jersey, Piscataway, New Jersey 08854 UDS, pp. 1-33.

J.Y. Huang, et al., "Microstructure of Cryogenic Treated M2 Tool Steel," Materials Science and Engineering A339 (2003) 241-244.

Chang-Xue (Jack) Feng, "An Experimental Study of the Impact of Turning Parameters on Surface Roughness", Paper No. 2036, Proceedings of the 2001 Industrial Engineering Research Conference, pp. 1-9.

PCT International Search Report for PCT/US 02/27548 dated Apr. 29, 2003.

Office Action dated Dec. 18, 2002 of U.S. Appl. No. 09/951,195.

Kabala Andrze, "Heat Transfer in Cutting Inserts," Experimental Stress Analysis 2001, $39^{th}$ International Conference.

P.K. Mehrotra, "Applications of Ceramic Cutting Tools," Key Engineering Materials, vol. 138-140 (1998), pp. 1-24.

Richard C. Dewes, et al., "The Use of High Speed Machining for the Manufacture of Hardened Steel Dies," Transactions of NAMRI/SME, vol. XXIV 1996.

T.J. Broskea., "PCBN Tool Failure Mechanism Analysis," Industrial Diamond Association, Intertech 2000 (www.mmsonline.com/articles).

E.M. Trent and P.K. Wright, "Metal Cutting," $4^{th}$ Ed., Butterworth, Boston, Oxford, 2000.

J.R. Davis (editor), ASM International Handbook, $9^{th}$ Ed., vol. 16, "Machining Ceramic Materials," 1995.

U.S. Appl. No. 09/951,195, filed Sep. 13, 2001, Zurecki et al.

Z. Zurecki and G.M. Harriott, "Development of Industrial Systems for Cost Effective Machining of Metals Using an Environmentally Friendly Liquid Nitrogen Coolant," Aerospace Mfg. Tech. Conf. 1998, Paper No. 981,865.

Zurecki et al., "Dry Machining of Metals with Liquid Nitrogen," $3^{rd}$ Intl. Machining and Grinding Conference, Oct. 1999.

J. Lin et al., "Estimation of Cutting Temperature in High Speed Machining," J. of Engineering Materials and Tech., vol. 114, Jul. 1992.

Technical specifications for S545-type milling cutter made by Niagara Cutter.

Machinability Data Center, "Machining Data Handbook," $3^{rd}$ Edition, vol. 1 and 2, Institute of Advanced Manufacturing Sciences, Inc. 1980.

F.E. Gorczyca, "Application of Metal Cutting Theory," Industrial Press, New York, 1987.

W.R. Devries, "Analysis of Material Removal Processes," Springer-Verlag, New York, 1992.

ASM International Handbook Committee, "Engineered Materials Handbook, Ceramics and Glasses," vol. 4, ASM Int., The Materials Information Soc., 1991.

J.R. Davis (editor), "Tool Materials," ASM Specialty Handbook, The Materials Information Society, 1998.

Y.K. Chou and C.J. Evans, "Microstructural Effects in Precision Hard Turning," MED-vol. 4, Manufacturing Science and Engineering, ASME 1996.

T. Kitagawa et al., "Temperature and wear of cutting in high-speed machining of Inconel 710 and Ti6Al-6V-2Sn," Wear 202 (1997), Elsevier Science, pp. 142-148.

F.L. Curzon, "The Leidenfrost Phenomenon," Am. J. Phys., 46 (8), Aug. 1978, pp. 825-828.

G.G. Lavalle et al., "A boiling heat transfer paradox," Am. J. Phys., vol. 60, No. 7, Jul. 1992, pp. 593-597.

T.W. Listerman et al., "Cooling by immersion in liquid nitrogen," Am. J. Phys., 54 (6), Jun. 1986, pp. 554-558.

J. Yang et al., "An Analytical Method to Determine the Liquid Film Thickness Produced by Gas Atomized Sprays," J. of Heat Transfer, Feb. 1996, vol. 118, pp. 225-258.

I. Mudawar and K.A. Estes, "Optimizing and Predicting Critical Heat Flux in Spray Cooling of a Square Surface," J. of Heat Transfer, Aug. 1996, vol. 118, pp. 672-679.

R.F. Barron and R.S. Stanley, "Film Boiling Under an Impinging Cryogenic Jet," Advances in Cryogenic Engineering, vol. 39, Plenum Press, New York 1994, pp. 1769-1777.

J.F. Shackelford et al., "CRC Materials Sci. & Engineering Handbook," $2^{nd}$ Edition, CRC Press, 1994.

R.R. Bird et al., "Transport Phenomena," John Wiley & Sons, New York, 1960.

F.R.S. Lima et al., "Numerical and Experimental Simulation for Cutting Temperature Estimation using 3-dimensional Inverse Heat Conduction Techniques."

Sep. 12, 2001 "Technical Information" for technical specifications for S545-type milling cutter made by Niagara Cutter.

\* cited by examiner

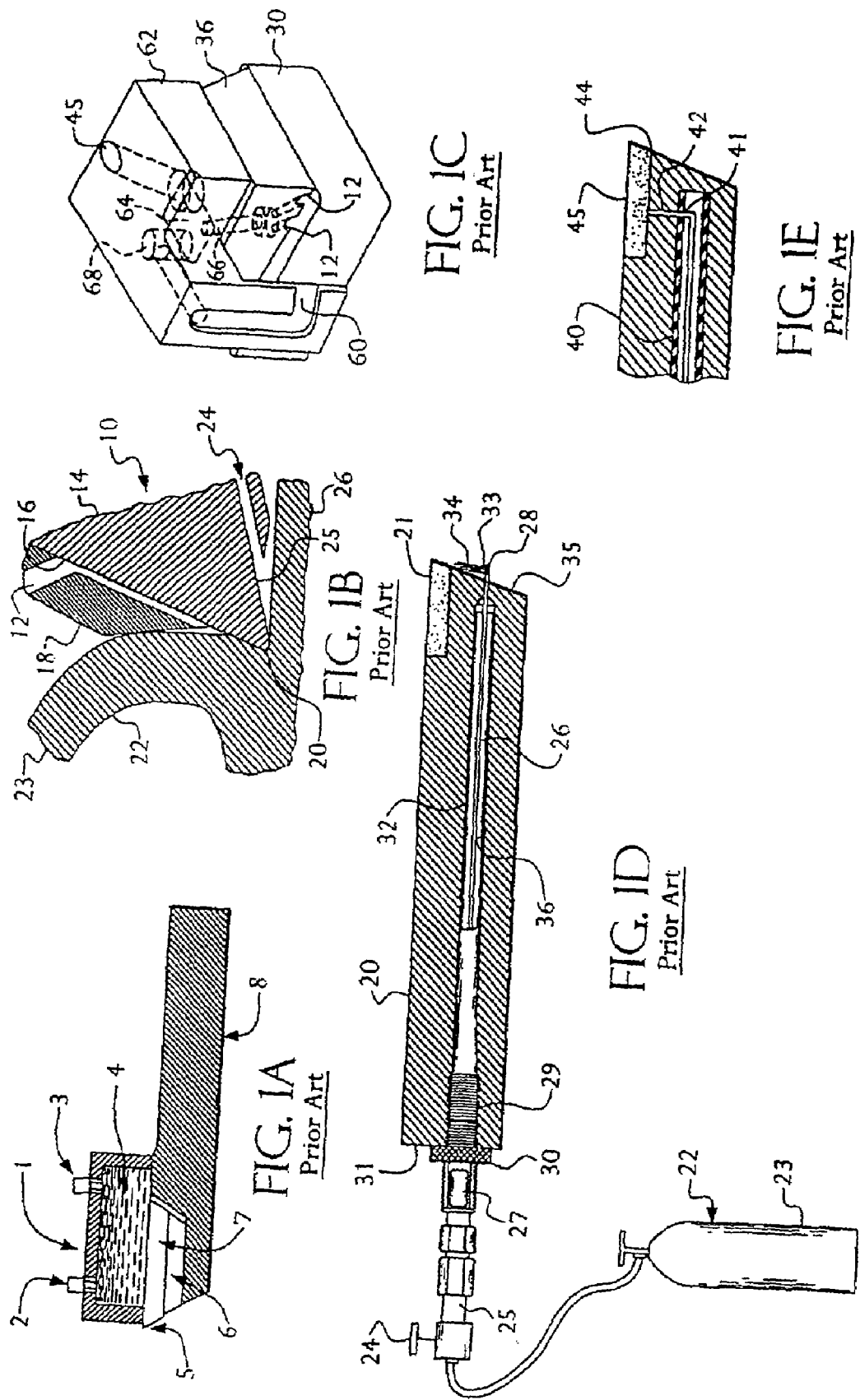

APPARATUS AND METHOD OF CRYOGENIC COOLING FOR HIGH-ENERGY CUTTING OPERATIONS

BACKGROUND OF THE INVENTION

The present invention relates to the field of machining of material by cutting (e.g., shaping parts by removing excess material in the form of chips), and more particularly machining of materials by cutting with cryogenically cooled cutting tools.

Numerous references are cited throughout this application, including the endnotes which appear after the Detailed Description of the Invention. Each of those references are incorporated herein by reference with regard to the pertinent portions of the references cited herein.

As used herein, the term "cutting" includes but is not limited to the following operations: turning, boring, parting, grooving, facing, planing, milling, drilling, and other operations which generate continuous chips or fragmented or segmented chips. The term cutting does not include: grinding, electro-discharge machining, ultrasonic cutting, or high-pressure jet erosion cutting, i.e., operations generating very fine chips that are not well defined in shape, e.g., dust or powder.

Cutting hard or difficult to machine materials, as well as high-speed cutting of materials from all groups except the low-melting point group including zinc or polymers, leads to very high levels of energy dissipated at the cutting tool. Table 1 below presents examples of easy and difficult to machine ferrous and non-ferrous metals with their machining responses modified by both composition and thermo-mechanical condition. Materials characterized by the unit power ($P_c$) of more than 1 hp/in$^3$/minute, unit energy ($E_c$) of more than 2.7 J/mm$^3$, and/or hardness of more than 30 HRC are considered difficult to machine. In the case of steels and other metals melting above 1400° C., high-speed machining proves difficult even if the hardness level is only 25 HRC.

TABLE 1

Examples of Hardness, Power, Energy and Temperature Encountered in Cutting[1]

| Materials: | Hardness: | Unit Power [hp/in$^3$/minute] | Unit Energy [Joules/mm$^3$] | Assumed Specific Density [grams/cm$^3$] | Assumed Specific Heat [cal./(gram * K)] | Nominal increase in Work Material/Chip Temperature [deg. K or C.] |
|---|---|---|---|---|---|---|
| Magnesium | 40-90 HB | 0.13-0.17 | 0.36-0.46 | | | |
| Low strength aluminum alloys | 30-150 HB | 0.20 | 0.55 | 2.7 | 0.21 | 230 |
| 6061 - T6 aluminum alloy | | 0.35 | 0.96 | 2.7 | 0.21 | 400 |
| 2024 - T4 aluminum alloy | | 0.46 | 1.26 | 2.7 | 0.21 | 520 |
| Soft copper alloys | 10-80 HRB | 0.50 | 1.37 | 8.9 | 0.09 | 400 |
| 70Cu-30Zn brass | | 0.59 | 1.61 | | | |
| Copper and harder copper alloys | 80-100 HB | 0.70-0.80 | 1.91-2.18 | 8.9 | 0.09 | 580 |
| Steels: | | | | | | |
| AISI 1020 carbon steel | 150-175 HB | 0.58 | 1.58 | 7.8 | 0.11 | 440 |
| AISI 1020 carbon steel | 176-200 HB | 0.67 | 1.83 | 7.8 | 0.11 | 500 |
| Carbon, alloy, and tool | 35-40 HRC | 1.15 | 3.14 | 7.8 | 0.11 | 870 |
| steels, | 40-50 HRC | 1.20 | 3.28 | 7.8 | 0.11 | 900 |
| various hardness | 50-55 HRC | 1.60 | 4.37 | 7.8 | 0.11 | ~1200 |
| levels . . . | 55-58 HRC | 2.75 | 7.51 | 7.8 | 0.11 | >1500 |
| Stainless steels, wrought and | 135-275 HB | 1.05 | 2.87 | | | |
| cast, | 30-45 HRC | 1.12 | 3.06 | | | |
| various hardness | 150-450 HB | 1.12 | 3.06 | | | |
| levels: . . . | | | | | | |
| Precipitation hardening stainless steels | | | | | | |
| Soft grades of cast irons | 110-190 HB | 0.55 | 1.50 | | | |
| Gray, ductile, and malleable grades | 190-320 HB | 1.12 | 3.06 | | | |
| Titanium alloys | 250-375 HB | 1.0-1.9 | 2.73-5.18 | 4.4 | 0.12 | 1186->1600 |
| Nickel based superalloys | 200-360 HB | 2.0 | 5.46 | 8.9 | 0.11 | >1350 |
| Niobium alloys | 217 HB | 1.4 | 3.82 | | | |
| Molybdenum | 230 HB | 1.6 | 4.37 | 10.2 | 0.06 | 1710 |
| Tantalum | 210 HB | 2.25 | 6.14 | | | |
| Tungsten | 320 HB | 2.3 | 6.28 | 19.2 | 0.03 | 2440 |

Notes:
1. Unit power - power at cutting tool required to remove work material at the rate of 1 in$^3$/minute.
2. Unit energy - total energy dissipated by cutting tool removing 1 mm$^3$ of material. 1.0 hp/in$^3$/min = 2.73 J/mm$^3$.
3. Listed above, average values of unit power required in turning are valid for sharp high-speed steel (HSS) and carbide (WC-Co) tools cutting within the feedrate range of 0.005 to 0.020 inches per revolution and exclude spindle efficiency factor. Average values of unit power required in milling may vary by +/− 10%.
4. Values of unit power should be multiplied by a factor of about 1.25 in the case of cutting with dull tools or tools characterized by a negative rake geometry.
5. Calculated above, nominal increase in chip temperature is an estimate assuming: (1) constant specific heat of work material across the entire temperature range, (2) no energy losses to work material and tool, and (3) a uniform temperature distribution across chip thickness including the chip/tool contact interface within so-called secondary shear zone.

Table 1 also shows how the unit power and energy translate into high temperatures of a machined chip staying in contact with the cutting tool. It is clear that the high-energy materials and cutting conditions require tool grades retaining hardness at the highest temperatures—hard but brittle grades of cemented carbides (WC—Co) and, ideally, advanced non-metallic tool materials that offer an ultimate level of hardness at the cost of low rupture strength and fracture toughness.

Table 2 below outlines the typical values of traverse rupture strength (TRS) and fracture toughness ($K_{1c}$) of the major groups of tool materials.

TABLE 2

Selected Properties of HSS, Carbide and Advanced Tool Materials - Cermets, Ceramics and Diamond[(2)]

| Tool material | Traverse rupture strength (MPa) | Fracture toughness ($K_{1c}$) MPa m$^{1/2}$ |
|---|---|---|
| $Al_2O_3$ | 500-700 | 2.5-4.5 |
| $Al_2O_3$—TiC | 600-850 | 3.5-4.5 |
| $Al_2O_3$-1% $ZrO_2$ | 700-900 | 5-8 |
| $Al_2O_3$—SiC | 550-750 | 4.5-8 |
| SiAlON | 700-900 | 4.5-6.5 |
| $Si_3N_4$ | 100-1000 | 1.5-8 |
| SiC | 550-860 | 4.6 |
| Polycryst. CBN (PCBN) | 800-1100 | 4-6.5 |
| Polycryst. Diamond (PCD) | 390-1550 | 6-8 |
| TiC—TiN—WC—TaC—Ni—Co—Mo (C7-C8/C3-C4 class) | 1360 | 8.5 |
| 97WC-3Co (with alloying additions) | 1590 | 9 |
| 71WC-12.5TiC-12TaC-4.5Co | 1380 | |
| 84WC-16Co (straight cemented carbide grades) | 3380 | 10-13.5 |
| High speed steel M42 (CPM grade) | 4000 | |

Comparing to the traditional high-speed steel (HSS) and tougher grades of cemented carbides containing more cobalt binder, the advanced, non-metallic tool materials are significantly more brittle, i.e., sensitive to irregularities in stress loading, irregularities in thermal loading or cooling and thermal stress shocking. Tools with a TRS value of less than 3 GPa (3000 MPa) and a $K_{1c}$ value of less than 10 MPa m$^{1/2}$ are considered brittle and prone to rapid fracturing under high-energy cutting conditions. Thus, the machining community is aware of the necessity of either avoiding the use of conventional cutting fluids when machining with these brittle tool materials or, if it is possible and practical in a given cutting operation, using the brittle tool materials with extreme care by a complete and uniform flooding of the tool, chip, and contact zone.

For example, numerous publications and tool manufacturer recommendations alert machining operators to the problem of reduced life of ceramic tools on contact with conventional cutting fluids. Despite the inherent deficiencies, e.g., overheated workpiece, reduced dimensional accuracy, or risk of chip fires, dry machining is recommended if hard but brittle tools are used. P. K. Mehrotra of Kennametal teaches in "*Applications of Ceramic Cutting Tools*", *Key Engineering Materials*, Vol. 138-140 (1998), Chapter 1, pp. 1-24: "the use of coolants is not recommended when these tools are used to machine steels due to their low thermal shock resistance". R. C. Dewes and D. K. Aspinwall ("*The Use of High Speed Machining for the Manufacture of Hardened Steel Dies*", *Trans. of NAMRI/SME*, Vol. XXIV, 1996, pp.21-26) tested a range of oxide and nitride tools including: 71% $Al_2O_3$—TiC, 75% $Al_2O_3$—SiC$_w$, 50% CBN—$AlB_2$—AlN, 50%-TiC—WC—AlN—$AlB_2$, 80% CBN—TiC—WC, as well as 95% CBN—Ni/Co. They found that the use of a conventional cooling fluid applied by flooding or spraying resulted in the reduction of tool life by more than 95% except for the whisker reinforced alumina, for which the life was shortened by about 88%. Similar test results showing a dramatic tool failure by brittle chipping on contact with cooling fluid have been published for PCBN cutting inserts by T. J. Broskea et al. of GE Superabrasives at MMS Online (www.mmsonline.com/articles) and by others elsewhere.

Table 3 below represents typical machining conditions recommended in the prior art for a range of work materials and tool materials. While different combinations of depth of cut (DOC), feedrate (F), cutting speed (Vc), and unit power (Pc), lead to high or low total power levels (P), the most important value characterizing high-energy cutting and critical to tool life is the power flux ($P_f$), which is calculated by dividing P by the cross-sectional area of an undeformed chip (a product of DOC and F).

TABLE 3

EXAMPLES OF MACHINING CONDITIONS RECOMMENDED IN PRIOR ART FOR A RANGE OF CUTTING, VARIABLES, INCLUDING WORK MATERIALS, WORK HARDNESS LEVELS, AND TOOL MATERIALS

| Work Material | Work Material Hardness | Tool Type and Material | Depth of cut, DOC [inches] | Feedrate, F [inch/rev] | Recommended Cutting Speed, Medium Value, Vc [feet/min] | Work Material Removal Rate, MRR [in3/min] | Assumed: Unit Power in Cutting, Pc in3/min] | Total Power, P [hp] | Power Flux. Pf [hp/ kW/mm2] |
|---|---|---|---|---|---|---|---|---|---|
| Carbon Steel, 1020 grade | 150 HB | indexable carbide, C-6 (P20) | 0.150 | 0.020 | 490 | 17.6 | 0.6 | 10.2 | 3.9 |
| Carbon Steel, 1020 grade | 150 HB | HSS, M2-M3 | 0.150 | 0.015 | 120 | 3.2 | 0.6 | 1.9 | 1.0 |
| H13 Tool Steels, Q&T | 48-50 HRC | indexable carbide, C-8 (P01) | 0.150 | 0.010 | 150 | 2.7 | 1.2 | 3.2 | 2.5 |
| H13 Tool Steels, Q&T | 48-50 HRC | indexable carbide, C-8 (P01) | 0.300 | 0.015 | 120 | 6.5 | 1.2 | 7.8 | 2.0 |
| High-carbon Alloy of Toot Steels | 52-54 HRC | indexable carbide, C-8 (P01) | 0.150 | 0.005 | 115 | 1.0 | 1.6 | 1.7 | 2.6 |
| Cold Work Too Steel | 58-60 HRC | PCBN (DBC50) | 0.012 | 0.004 | 490 | 0.3 | 3.0 | 0.8 | 20.4 |
| Austenitic St. Steels | 135-185 HB | indexable carbide, C-2 (K10/M10) | 0.150 | 0.020 | 350 | 12.6 | 0.8 | 10.1 | 3.9 |
| Austenitic St. Steels | 135-185 HB | Cold-pressed Alumina, ceramic | 0.150 | 0.010 | 900 | 16.2 | 0.8 | 13.0 | 10.0 |
| Austenitic St. Steels | cold drawn to 275 HB | indexable carbide, C-3 | 0.150 | 0.015 | 300 | 8.1 | 0.9 | 7.3 | 3.7 |

TABLE 3-continued

EXAMPLES OF MACHINING CONDITIONS RECOMMENDED IN PRIOR ART FOR A RANGE OF CUTTING,
VARIABLES, INCLUDING WORK MATERIALS, WORK HARDNESS LEVELS, AND TOOL MATERIALS

| Work Material | Work Material Hardness | Tool Type and Material | Depth of cut, DOC [inches] | Feedrate, F [inch/rev] | Recommended Cutting Speed, Medium Value, Vc [feet/min] | Work Material Removal Rate, MRR [in3/min] | Assumed: Unit Power in Cutting, Pc in3/min] | Total Power, P [hp] | Power Flux. Pf [hp/ [kW/mm2] |
|---|---|---|---|---|---|---|---|---|---|
| Austenitic St. Steels | cold drawn to 275 HB | HSS, T15-M42 | 0.150 | 0.015 | 80 | 2.2 | 0.9 | 1.9 | 1.0 |
| Ti-6Al-4V ELI | 310-350 HB | indexable carbide, C-2 (K10, M10) | 0.150 | 0.008 | 195 | 2.8 | 1.4 | 3.9 | 3.8 |
| Ti-6Al-4V ELI | 310-350 HB | HSS, T15-M42 | 0.150 | 0.010 | 60 | 1.1 | 1.4 | 1.5 | 1.2 |

NOTES:
CUTTING POWER, POWER FLUX, AND VELOCITY INDEX ARE ESTIMATED FROM DATA IN TABLE 1.
REFERENCES FOR MACHINING CONDITIONS - IAMS AND ASM LISTED IN TABLE 1.
Power Flux = Total Power/DOC/F
1 hp/in2 = 1.15 W/mm2

The representative examples in Table 3 are not intended to be an exhaustive list. Persons skilled in the art will recognize that numerous other conditions are possible that would result in similar patterns.

High values of power flux indicate the magnitude of potential upset in thermo-mechanical tool loading or irregularity in tool cooling. Only the HSS tools and certain cemented carbide tools operate under the range of cutting conditions where these process irregularities can be neglected. Being a product of cutting speed and unit power, power flux indicates whether a given set of machining conditions leads to a high-energy cutting situation. If a cutting speed is selected for a given tool, depth of cut, and feedrate, which is higher than the cutting speed recommended by the tool manufacturer, and/or the work material requires unit cutting power exceeding 1 hp/in$^3$/minute, the resultant power flux value exceeds the conventional power flux value and the operation may be classified as high-energy cutting.

Although the machining industry has strong economic incentives to enhance cutting operations within the high-energy range, it is limited by tool overheating, high power flux values, and inability of removing cutting energy from tools in a uniform manner required to prevent rapid failures. All tool materials, including HSS, carbides, and refractory ceramics, have one thing in common—as the temperature of the tool material increases, the tool material softens and may develop localized, internal stresses (due to thermal expansion, especially if compounded with limited conductivity), as described by E. M. Trent and P. K. Wright in *"Metal Cutting"*, 4$^{th}$ Ed., Butterworth, Boston, Oxford, 2000, and the ASM Handbook on *"Machining, Ceramic Materials"*. This poses limits on workpiece hardness, cutting speed, and power flux during machining. With conventional machining methods, the industry is unable to cope with the cooling problem while satisfying the other needs enumerated above. Other problems facing the machining industry include significant environmental and health related problems associated with the conventional cutting fluids and coolants presently used in the industry. For example, carbon dioxide ($CO_2$), a commonly used industrial coolant, is a greenhouse generator. Also, since $CO_2$ is denser than air it presents a potential asphyxiation concern. In addition, $CO_2$ also has the potential to cause acid corrosion, since it is soluble in water. Freons and freon substitutes, some other commonly used coolants, also are greenhouse generators and ozone depleters. These substances also are explosive and/or toxic when heated on contact with red-hot solids. Other coolants which can be explosive include hydrocarbon gases and liquified ammonia. Coolants such as cryogenic/liquified air with oxygen in it can result in chip fires.

There exists a relatively large body of prior art publications pertaining to cryogenic cooling of tools, including: WO 99/60079 (Hong) and U.S. Pat. No. 5,761,974 (Wang, et al.), U.S. Pat. No. 5,901,623 (Hong), U.S. Pat. No. 3,971,114 (Dudley), U.S. Pat. No. 5,103,701 (Lundin, et al.), U.S. Pat. No. 6,200,198 (Ukai, et al.), U.S. Pat. No. 5,509,335 (Emerson), and U.S. Pat. No. 4,829,859 (Yankoff). However, none these publications nor the other prior art references discussed herein solve the problems discussed above or satisfy the needs set forth below.

U.S. Pat. No. 5,761,974 (Wang et al.) discloses a cryogenically cooled cap-like reservoir placed at the top of a cutting tool, as shown in FIG. 1A herein (corresponding to FIG. 1 of Wang et al.). Wang's method and apparatus provides for uniform and stable cooling, except that the reservoir requires dedicated tooling and repositioning if depth of cut and/or feedrate are changed during cutting operations. Such requirements and limitations are cost-prohibitive and unacceptable in the industrial machining environment.

U.S. Pat. No. 5,901,623 (Hong) discloses a cryogenic fluid spraying chip-breaker which is positioned adjacent the rake face for lifting a chip from the rake face after the chip is cut from the workpiece. See FIGS. 1B and 1C herein (corresponding to FIGS. 3 and 7B of Hong). Hong's method does not provide for uniform cooling of the entire cutting tool, which is desired in the case of hard but brittle tools used in high-energy cutting operations.

Moreover, Hong's chip-breaking nozzle requires dedicated tooling and repositioning if depth of cut and/or feedrate are changed during cutting. Such requirements and limitations are cost-prohibitive and unacceptable in the industrial machining environment.

U.S. Pat. No. 3,971,114 (Dudley) discloses a cryogenic coolant tool apparatus and method in which the tool is internally routed, the internal passage is thermally insulated, and the coolant stream is jetted at a precise angle at the interface between the tool edge and the workpiece so that the chip cutting from the workpiece does not interfere with the stream. See FIGS. 1D and 1E herein (corresponding to FIGS. 2 and 3A of Dudley). This method also does not provide the desired uniform cooling of hard but brittle cutting tools used in high-energy cutting operations. Moreover, it requires an involved, dedicated tooling. This requirement is cost-prohibitive and unacceptable in the industrial machining environment.

U.S. Pat. No. 5,103,701 (Lundin, et al.) discloses a method and apparatus for the diamond machining of materials which detrimentally react with diamond cutting tools in which hard but brittle tools, which improves tool life in cutting operations characterized by power flux values exceeding the common values recommended for conventional machining processes by tool manufacturers, tool suppliers, and technical authorities recognized within the machining industry.

It is further desired to have an apparatus and a method for cooling such cutting tools that increases work material cutting speeds and/or productivity, both of which are limited by the lifetime (and costs) of cutting tools, inserts, and tips.

It is still further desired to have an apparatus and a method for machining a workpiece which improves safety and environmental conditions at workplaces by using a cryogenic coolant to cool cutting tools, thereby eliminating conventional, emulsified cutting fluids and/or oil mists.

It is still further desired to have an apparatus and a method for machining a workpiece which improves safety and environmental conditions at workplaces by minimizing the risks of chip fires, burns and/or chip vapor emissions while using an environmentally acceptable, safe, non-toxic and clean method of cooling cutting tools.

It is still further desired to have an apparatus and a method for machining which reduces production costs by elimination of workpart, workplace, and/or machine cleaning necessitated by the use of conventional, emulsified cutting fluids and/or oil mists.

It is still further desired to have an apparatus and a method for machining which provides for effective cutting of work materials that cannot tolerate conventional, emulsified cutting fluids and/or oil mists, such as medical products or powder-metallurgy parts characterized by open porosity.

It is still further desired to have an apparatus and a method for cooling cutting tools, an apparatus and a method for controlling cooling of cutting tools during cutting operations, and an apparatus and a method for machining a workpiece, which overcome the difficulties and disadvantages of the prior art to provide better and more advantageous results.

BRIEF SUMMARY OF THE INVENTION

Applicants' invention is an apparatus and a method for cooling a cutting tool, an apparatus and a method for controlling cooling of a cutting tool during a cutting operation, and an apparatus and a method for cooling a workpiece. Another aspect of the invention is an apparatus and a method for machining a workpiece with a cutting tool using the apparatus and method for cooling the cutting tool and/or the apparatus and method for controlling cooling of the cutting tool. Other aspects are a workpiece machined by the apparatus and method for machining, and the recyclable chips removed from the workpiece as a byproduct of the apparatus and method for machining.

A first embodiment of the method for cooling a cutting tool includes multiple steps. The first step is to provide a supply of a cryogenic fluid. The second step is to deliver a free-expanding stabilized jet of the cryogenic fluid to the cutting tool. ("A free-expanding stabilized jet" is defined and discussed in the Detailed Description of the Invention section below.)

There are several variations of the first embodiment of the method for cooling. In one variation, the cutting tool is engaged in a high-energy chip-forming and workpiece-cutting operation. Preferably, at least a portion of the cryogenic fluid is selected from a group consisting of liquid nitrogen, gaseous nitrogen, liquid argon, gaseous argon and mixtures thereof. In another variation, at least a portion of the free-expanding stabilized jet of the cryogenic fluid has a temperature below about minus 150 degrees Celsius (−150° C.). In another variation, at least a portion of the free-expanding stabilized jet of the cryogenic fluid has a substantially uniform mass flowrate greater than or equal to about 0.5 lbs/minute and less than or equal to about 5.0 lbs/minute. In another variation, at least a portion of the free-expanding stabilized jet of the cryogenic fluid has a substantially uniform mass flowrate having a flow pulse cycle time less than or equal to about 10 seconds. In another variation, the cutting tool has a rake surface and at least a portion of the free-expanding stabilized jet of the cryogenic fluid impinges on at least a portion of the rake surface. In another variation, at least a portion of the cutting tool has a traverse rupture strength (TRS) value of less than about 3000 MPA. In another variation, the cutting tool has a cutting edge and a means for delivering the free-expanding stabilized jet of the cryogenic fluid to the cutting tool has at least one discharge point spaced apart from the cutting edge by a distance greater than or equal to about 0.1 inches and less than about 3.0 inches. In a variant of this variation, at least a portion of the cryogenic fluid has a pressure greater than or equal to about 25 psig and less than or equal to about 250 psig during or immediately prior to discharge from the at least one discharge point.

In another embodiment of the method for cooling a cutting tool, in which the cutting tool has a cutting edge, there are multiple steps. The first step is to provide a supply of a cryogenic fluid. The second step is to provide a nozzle adapted to discharge a jet of the cryogenic fluid. The nozzle has at least one discharge point spaced apart from the cutting edge by a distance greater than or equal to about 0.1 inches and less than about 3.0 inches. The third step is to deliver a free-expanding stabilized jet of the cryogenic fluid from the discharge point to the cutting tool, wherein the cryogenic fluid has a temperature of about minus 150 degrees Celsius (−150° C.) at the discharge point.

Another aspect of the invention is a method for machining a workpiece with a cutting tool using a method for cooling the cutting tool as in the first embodiment of the method for cooling. Other aspects are a workpiece machined by such a method for machining and characterized by an improved surface, and recyclable chips removed from the workpiece as a byproduct of the method for machining the workpiece, the recyclable chips being characterized by an improved purity.

The method for cooling a workpiece involves multiple steps. The first step is to provide a supply of a cryogenic fluid. The second step is to deliver a free-expanding stabilized jet of the cryogenic fluid to the workpiece.

A first embodiment of the method for controlling cooling of a cutting tool during a cutting operation includes multiple steps. The first step is to provide a supply of a cryogenic fluid. The second step is to deliver a flow of the cryogenic fluid to the cutting tool. The third step is to regulate the flow of the cryogenic fluid to the cutting tool at a substantially uniform mass flowrate, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C. In one variation of this embodiment, the cutting tool is engaged in a high-energy chip-forming and workpiece-cutting operation.

Another embodiment of the method for controlling cooling of a cutting tool during a cutting operation includes multiple steps. The first step is to provide a supply of a cryogenic fluid. The second step is to provide a nozzle adapted to discharge a flow of the cryogenic fluid, the nozzle having at least one discharge point spaced apart from the cutting tool. A third step is to deliver a flow of the cryogenic fluid from the discharge point to the cutting tool. The fourth step is to regulate the flow of the cryogenic fluid to the cutting tool at a substantially uniform mass flowrate greater than or equal to about 0.5 lbs/minute and less than or equal to about 5.0 lbs/minute having a flow pulse cycle time less than or equal to about 10 seconds, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C.

Another aspect of the invention is a method for machining a workpiece with a cutting tool using a method for controlling cooling of the cutting tool as in the first embodiment of the method for controlling cooling. Other aspects are a workpiece machined by this method for machining and characterized by an improved surface, and the recyclable chips removed from the workpiece as a byproduct of this method for machining, which chips are characterized by an improved purity.

A first embodiment of the apparatus for cooling a cutting tool includes: a supply of a cryogenic fluid; and means for delivering a free-expanding stabilized jet of the cryogenic fluid to the cutting tool.

There are several variations of the first embodiment of the apparatus for cooling. In one variation, the cutting tool is engaged in a high-energy chip-forming and workpiece-cutting operation. Preferably, at least a portion of the cryogenic fluid is selected from a group consisting of liquid nitrogen, gaseous nitrogen, liquid argon, gaseous argon and mixtures thereof. In another variation, at least a portion of the free-expanding stabilized jet of the cryogenic fluid has a temperature below about minus 150 degrees Celsius (−150° C.). In another variation, at least a portion of the free-expanding stabilized jet of the cryogenic fluid has a substantially uniform mass flowrate greater than or equal to about 0.5 lbs/minute and less than or equal to about 5.0 lbs/minute. In another variation, at least a portion of the free-expanding stabilized jet of the cryogenic fluid has a substantially uniform mass flowrate having a flow pulse cycle time less than or equal to about 10 seconds. In another variation, the cutting tool has a rake surface and at least a portion of the free-expanding stabilized jet of the cryogenic fluid impinges on at least a portion of the rake surface. In another variation, at least a portion of the cutting tool has a traverse rupture strength (TRS) value of less than about 3000 MPa. In another variation, the cutting tool has a cutting edge and a means for delivering the free-expanding stabilized jet of the cryogenic fluid to the cutting tool has at least one discharge point spaced apart from the cutting edge by a distance greater than or equal to about 0.1 inches and less than about 3.0 inches. In a variant of this variation, at least a portion of the free-expanding stabilized jet of the cryogenic fluid has a pressure greater than or equal to about 25 psig and less than or equal to about 250 psig during or immediately prior to discharge from the at least one discharge point.

In another embodiment of the apparatus for cooling a cutting tool, in which the cutting tool has a cutting edge, there are several elements. The first element is a supply of a cryogenic fluid. The second element is a nozzle adapted to discharge a jet of the cryogenic fluid. The nozzle has at least one discharge point spaced apart from the cutting edge by a distance greater than or equal to about 0.1 inches and less than about 3.0 inches. The third element is a means for delivering a free-expanding stabilized jet of the cryogenic fluid from the discharge point to the cutting tool, wherein the cryogenic fluid has a temperature of about minus 150 degrees Celsius (−150° C.) at the discharge point.

Another aspect of the invention is an apparatus for machining a workpiece with a cutting tool using an apparatus for cooling the cutting tool as in the first embodiment of the apparatus. Other aspects are a workpiece machined by an apparatus for machining and characterized by an improved surface, and recyclable chips removed from the workpiece as a byproduct, the recyclable chips being characterized by an improved purity.

The apparatus for cooling a workpiece includes: a supply of a cryogenic fluid; and a means for delivering a free-expanding stabilized jet of the cryogenic fluid to the workpiece.

A first embodiment of the apparatus for controlling cooling of a cutting tool during a cutting operation includes several elements. The first element is a supply of a cryogenic fluid. The second element is a means for delivering a flow of the cryogenic fluid to the cutting tool. The third element is a means for regulating the flow of the cryogenic fluid to the cutting tool at a substantially uniform mass flow rate, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C. In one variation of this embodiment, the cutting tool is engaged in a high-energy chip-forming and workpiece-cutting operation.

Another embodiment of the apparatus for controlling cooling of a cutting tool during a cutting operation includes several elements. The first element is a supply of a cryogenic fluid. The second element is a nozzle adapted to discharge a flow of the cryogenic fluid. The nozzle has at least one discharge point spaced apart from the cutting tool. The third element is a means for delivering a flow of the cryogenic fluid from the discharge point to the cutting tool. The fourth element is a means for regulating the flow of the cryogenic fluid to the cutting tool at a substantially uniform mass flowrate greater than or equal to about 0.5 lbs/minute and less than or equal to about 5.0 lbs/minute having a flow pulse cycle time less than or equal to about 10 seconds, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C.

Another aspect of the invention is an apparatus for machining a workpiece with a cutting tool using a method for controlling cooling of the cutting tool as in the first embodiment of the apparatus for controlling cooling. Other aspects are a workpiece machined by this apparatus for machining and characterized by an improved surface, and the recyclable chips removed from the workpiece as a byproduct, which chips are characterized by an improved impurity.

BRIEF DESCRIPTION OF THE DRAWINGS

The invention will be described by way of example with reference to the accompanying drawings, in which:

FIGS. 1A to 1E illustrate various prior art devices used for cryogenic cooling in cutting or machining operations;

DETAILED DESCRIPTION OF THE INVENTION

The invention addresses fundamental, unresolved needs of the machining industry—to produce cleaner parts faster and at less cost, and to improve environmental and health conditions in manufacturing operations. An important factor in reducing manufacturing costs is to replace slow grinding operations on hard to machine parts with more cost-effective cutting operations. The machining industry needs improved methods for hard-turning. Another important but frequently overlooked factor is the cost of tooling and conventional process modifications. The machining industry needs machining process improvements that also minimize the extent of the modifications required to existing equipment and processes.

The invention is an apparatus and a method for cooling a cutting tool, an insert, a tip, an edge, a blade, or a bit, any of which may be either stationary or moving (e.g., rotating, with respect to a workpiece), by using a free-expanding (unconstrained) stabilized jet of cryogenic fluid. The jet of cryogenic fluid, which may be a single phase gas, a single phase liquid, or a two-phase combination, preferably is liquid nitrogen, gaseous nitrogen, liquid argon, gaseous argon, and/or mixtures thereof. However, persons skilled in the art will recognize that other cryogenic mixtures of liquids, gases, and solid particles could be used as the cryogenic fluid.

The free-expanding or unconstrained jet is a stream of cryogenic fluid expanded from a higher pressure via a nozzle into an unconfined surrounding or a space. Due to differences in velocity, density, and temperature, the resultant shearing forces and mixing eddies lead to the aspiration of surrounding gas(es), such as ambient air. A jet expanding from a nozzle located at or above a flat plane, such as rake surface, is free-expanding, but a jet expanding between two or more fixed planes is not free-expanding, because the boundary film attachment effect is significantly enhanced and aspiration of the surrounding gas atmosphere is significantly reduced. (Rake surface is the cutting tool surface adjacent the cutting edge which directs the flow of the chip away from the workpiece. In the embodiment shown in FIG. 2A, rake surface is the cutting tool surface adjacent the cutting edge which directs the flow of the chip 86. The rake surface may be completely flat, chamfered or may have a more complex, three-dimensional topography produced by molding or an addition of a plate in order to provide an enhanced control chip flow and/or chip breaking.)

Figure 2B:
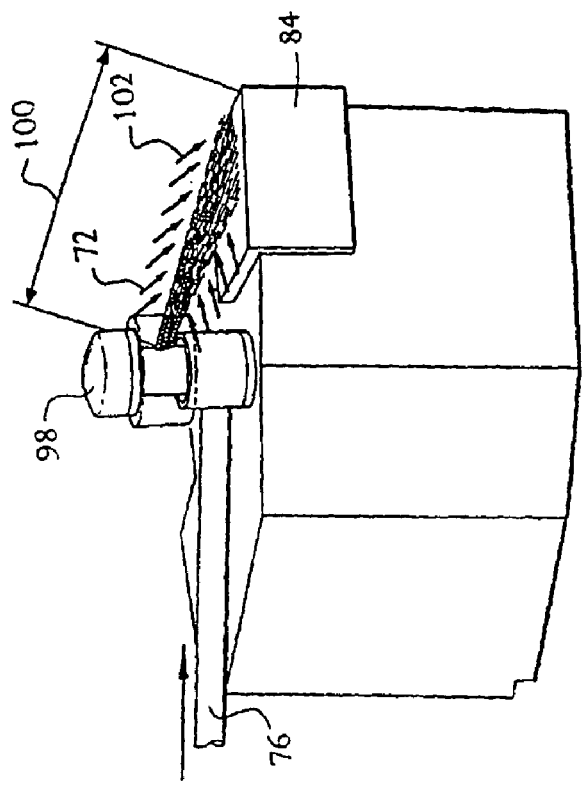
FIG. 2B is a schematic illustration of an embodiment of the invention used in a turning operation.

The nozzle for issuing a free-expanding jet may be made of tubing terminating behind, above, or at the rake surface. Alternatively, the nozzle also may be made in the form of a channel drilled in an insert-holding clamp 80 holding a cutting tool on the back end within a toolholder 82 as shown in FIG. 2A. The nozzle may be formed by any combination of fixed or adjustable mechanical components attached to an insert-holding clamp or a toolholder which have channels drilled for the discharge of the cryogenic fluid from the desired distance at a rake surface and toward a cutting edge of the rake surface. FIG. 2B illustrates an example of an adjustable-angle nozzle attached to a toolholder. The nozzle exit may be round or flat vertically or horizontally, converging, straight or diverging. There are no particular limitations on the nozzle, as long as the nozzle jets a free-expanding jet of cryogenic fluid at the tool from the desired distance in the desired direction while positioned away from the chip.

FIG. 2A illustrates a preferred embodiment of an apparatus 70 taught by the invention in which a free-expanding jet of cryogenic fluid 72 is directed at the surface of a tip 74 of a cutting tool. Cryogenic fluid passes through a delivery tube 76 and through bore 78 which is drilled throughout a clamp 80 to form a nozzle. The clamp is attached to a toolholder 82 by a fastening mechanism (not shown). The jet of cryogenic fluid expands from the nozzle onto the tip 74 of a cutting insert 84. In a most preferred mode of operation, the free-expanding jet terminates at the surface of the tip of the cutting insert. Alternatively, the free-expanding jet may be allowed to expand further away to reach the chip 86 evolving from the workpiece as well as the surface of the workpiece around the chip and the tool/workpiece contact zone.

The embodiment shown in FIG. 2A minimizes the extent of modifications needed on a standard machining tool set-up to practice the present invention. The cryogenic fluid jetting nozzle is incorporated into a metal clamp 80 commonly used for holding the cutting ?O inserts 84 in work position, which cutting inserts may be made of a brittle material. The exit of the nozzle and the front part of the clamp are located away from the chip 86 evolving from the workpiece 88 during cutting, and are never in continuous contact with the chip and do not participate in the chip breaking operation.

The illustration in FIG. 2A shows the direction 90 of rotation (measured in RPM) of the workpiece 88, the depth of cut (DOC) 92, the feed rate (F=undeformed chip thickness) 94, and the cutting power 96.

Figure 2C:
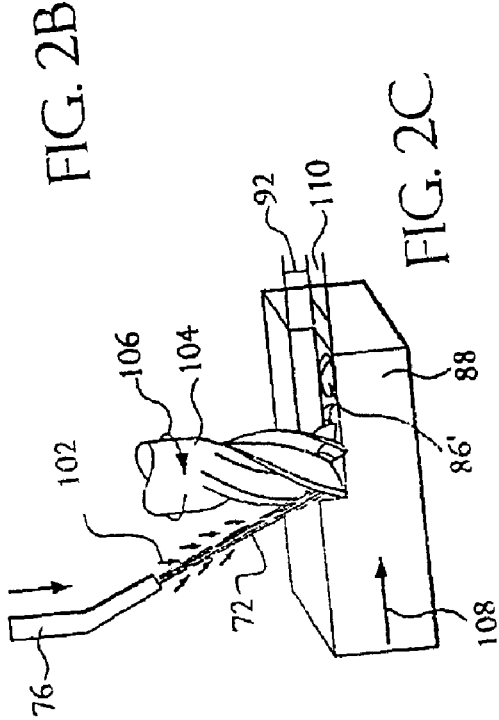
FIG. 2C is a schematic illustration of an embodiment of the invention used in a milling operation.
Figure 2A:
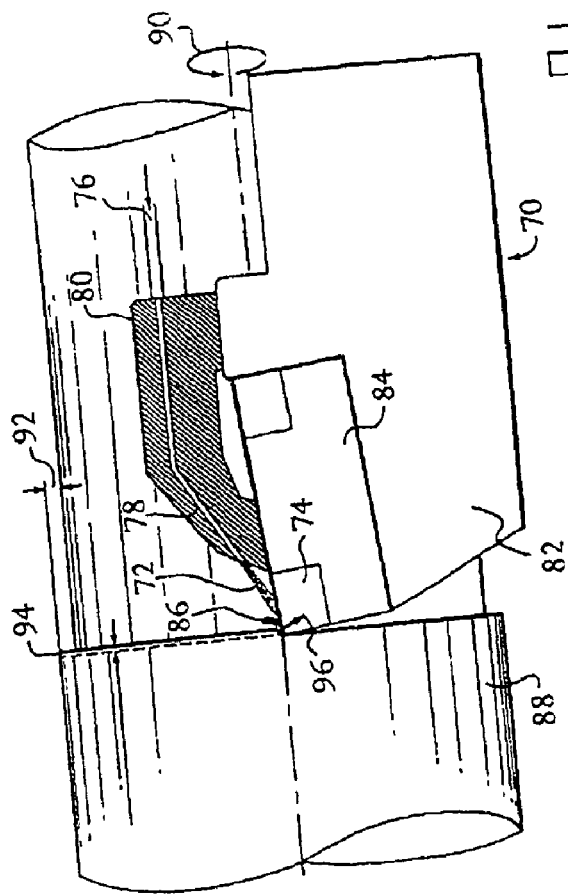
FIG. 2A is a schematic illustration of one embodiment of the invention.

FIGS. 2B and 2C illustrate a preferred mode of jet application in turning and milling operations. The jet of cryogenic fluid 72 impinges directly at the target tool. For the turning application (FIG. 2B), the cryogenic fluid enters delivery tube 76 and is discharged from the nozzle assembly 98, which is an adjustable-angle nozzle. A free-expanding stabilized jet of cryogenic fluid is transmitted from the nozzle assembly to the tool nose of the cutting tool insert 84. The axial length 100 of the jet from the nozzle exit to the tool nose is a critical feature of the invention, as discussed herein. The arrows 102 indicate entrainment of ambient air by the jet.

In the milling operation shown in FIG. 2C, the free-expanding stabilized jet of cryogenic fluid 72 is transmitted from a nozzle at the end of the delivery tube 76. The distance between the nozzle and the tool 104 must be less than three inches. The arrows 102 indicate entrained ambient air. The tool rotates in the direction shown by the arrow 106 as the workpiece 88 moves in the direction shown by the arrow 108. The figure illustrates a depth of cut 92, a width of cut 110, and the chips 86' formed by the milling process.

Cryogenic nitrogen and/or argon fluids (in liquid or gaseous phase) are preferred because these fluids are inert, non-toxic, non-corrosive, acceptable environmentally, and can be made sufficiently cold at the exit of the nozzle to refrigerate a remote target, such as a cutting tool, if jetted at the target from a distance. The boiling points of liquid nitrogen, liquid argon, and several other cryogenic fluids scale with their delivery pressure to reach the following minimum if expanded into a 1 atmosphere pressure environment:

liquid $N_2 = -196°$ C. $= -320°$ F.
liquid Ar $= -186°$ C. $= -302°$ F.
liquid $CO_2 = -79°$ C. $= -110°$ F. (sublimation point)
chlorofluorocarbon Freon-12 $CCl_2F_2 = -30°$ C. $= -22°$ F.

An expanding jet tends to entrain a large quantity of ambient gas, such as room temperature air in typical machining operations. The entrainment of room temperature air results in a drastic reduction of refrigeration capacity of a cryogenic jet within a relatively short distance from a nozzle exit. U.S. Pat. No. 5,738,281 (Zurecki et al.) discloses a method of minimizing this entrainment in the case of isothermal or preheated gas jets. However, that patent does not teach about free-expanding, cryogenic jets which tend to expand both radially and axially on mixing with warmer surroundings.

Applicants discovered that if a cryogenic fluid is jetted from a distance of 0.1 to 3.0 inches at a target tool surface, has an initial temperature at the nozzle exit less than minus 150° C. ($-150°$ C.), and has a flowrate of at least 0.5 lbs/minute, then the jet of cryogenic fluid arriving at the tool surface is sufficiently cold and can, potentially, enhance the life of the tool under high-energy cutting conditions. Applicants also discovered that if the flowrate of the cryogenic fluid jet exceeds 5.0 lbs/minute (37.8 grams/second), excessive spreading of the jet of cryogenic fluid within the cutting area results in a detrimental pre-cooling of workpiece material, a transient effect of hardening the workpiece just upstream of the cutting edge, leading to a drop in tool life. Applicants also determined that the minimum discharge pressure required for effective tool cooling is 25 psig (1.7 atm). The maximum pressure (250 psig) is established by the large-scale economics of storing and handling cryogenic nitrogen and argon—the most common and cost-effective large tanks holding these cryogens are rated up to 230 psig and rapidly vent a thermally compressed and expanding cryogen if the cryogen pressure exceeds 250 psig (17 atm). Applicants recognized that in order to meet the economic necessities of the machining industry, the cryogenic cooling of tools engaged in high-energy cutting operations should be performed using a cryo-fluid stream sourced from a large, "bulk" tank under its own cryogenic vapor pressure. Thus, Applicants optimized their tool cooling procedure for a maximum discharge pressure of no more than 250 psig. The discharge pressure is the pressure measured at the inlet side of the cryogenic fluid jetting nozzle.

The free-expanding jet of cryogenic fluid should be aimed toward the rake, nose, and cutting edge of the cutting tool to maximize the cooling effect. If the use of multiple cryo-jets is desired in a given cutting operation due to work material or tool geometry considerations, the primary cryo-jet characterized by the highest flowrate should be aimed toward the rake, nose, and cutting edge. Applicants found it surprising and unexpected that the cryogenic fluid jet impinged at the rake surface in such a way that the jet does not induce fractures, chipping, or cleavage of hard but brittle tool materials preferred in high-energy cutting operations. The advanced, non-metallic tools, as well as other hard but brittle tools (characterized by a traverse rupture strength of less than 3 GPa or a fracture toughness of less than 10 MPa $m^{0.5}$) cooled according to Applicants' method lasted longer than the same type of tools operated dry under high-energy cutting conditions. This finding is contrary to the teachings of the prior art While the exact reasons for the surprising and unexpected results (which provide a substantial improvement over the prior art) are not clear, it appears that these results may be due to a combination of factors. Without wishing to be bound by any particular theory, Applicants believe that these factors include but are not limited to: (1) cryogenic hardening of the entire cutting tool material, (2) reduction in thermal expansion-driven stresses within the entire tool, and (3) reduction in thermal gradients at tool surfaces due to the boundary film effect and the Leidenfrost phenomenon. The boundary film is a jetting condition-controlled, semi-stagnant, transient film which "softens" the cryogenic chilling effect and "smoothens" thermal profiles at the impingement-cooled surface. The Leidenfrost phenomenon occurs to a larger or smaller degree with all liquids sprayed at a target surface that is hotter than the boiling point of the liquid. Liquid drops boil above a hot surface and, thus, the hot surface is screened by a layer of vapor. In the case of cryogenic liquids, especially if colder than $-150°$ C., all tool surfaces are hot, which means that a typical cryo-liquid jet slides on a boundary film of its vapor without directly wetting the tool. This makes the thermal profile of the impingement-cooled tool surface smoother and may explain why Applicants' free-expanding cryo-fluid jet is effective in enhancing the life of brittle tools. In the case of an oil or water-based cutting fluid, with its boiling point significantly higher than room temperature, boiling occurs only at a very close distance from the perimeter of a chip contact zone at a tool surface. When the chip changes direction during cutting, or the cutting tool encounters a sudden cutting interruption, such a conventional fluid spreads over a suddenly exposed, hottest tool surface area where it boils explosively, releasing vapor, microdroplets, and pressure waves. The boundary film thickness, Leidenfrost phenomenon, sudden changes in boiling behavior with a change in temperature difference between jetted liquid and target surface (hydrodynamic instabilities), as well as the importance of nozzle orientation and flow conditions, have been taught in many references.[3] Applicants believe that their method, practiced within the above-described range of cryo-fluid jetting conditions, promotes the desired, thin boundary film and/or Leidenfrost effects which, in turn, prevents fracturing of brittle tools while cooling and enhances tool life during high-energy cutting operations.

As shown in FIGS. 2B and 2C, Applicants' method and conditions for free-expanding jet cooling overcome the fundamental shortcomings of the prior art pertaining to cryogenic machining. Since Applicants' nozzle is located well behind the area of chip formation and the work-tool contact zone, the feed-rate, depth of cut, and other machining conditions could be easily changed during a given operation without a need for readjusting the nozzle placement or risk of nozzle damage. Thus, the machining industry may practice the invention with minimum costs, no disruptions, enjoying the operational flexibility that arises from the fact that the nozzle is not attached to a cutting insert or dependant on any particular insert geometry. A key to an effective tool cooling with the free-expanding jet is the adjustment of the cryo-fluid flowrate within the range of 0.5 to 5.0 lbs/minute and the supply pressure within the range of 25 to 250 psig in order to deliver its refrigeration capacity from the exit of the remote nozzle to the rake surface.

Applicants found that a time-average cryo-fluid flowrate becomes sufficient only when the walls of the cutting tool are frosted during the entire cutting operation in spite of the fact that a significant amount of cutting energy, i.e., heat, enters the tool through the hot chip contact area. If the frost line forms during cutting near the cutting edge and contact zone on the side walls and rake which moves back toward the other end of the tool, the cryogenic cooling effect is diminished, indicating the need for an increase in the time averaged flowrate and/or pressure of the cryo-fluid. Note that under the preferred conditions, no frost coating is expected to develop inside the spot of the direct impingement of the cryogenic fluid, a moisture-free product of $N_2$ and/or Ar. Thus, a part of the rake and/or side-wall surface may be free of frost coating because of a continuous washing by a rapidly expanding and moisture-free cryo-fluid.

An exception to the tool frost-coating rule would occur if cutting operations are carried out under very low humidity conditions, e.g., in a controlled atmosphere chamber or in a vacuum where the benefits of the invention could be achieved without producing a frost coating. The normal atmospheric conditions for the tool frosting control are 55% relative humidity (RH) plus or minus 20% and 20° C. temperature plus or minus 5° C. The minimum moisture content for the frosting control is 30% relative humidity at a temperature of at least 10° C.

Applicants also developed a diagnostic technique for controlling the high-energy cutting operation carried out according to the invention and involving observation of dynamic effects at the tool-workpiece interface which may change during any particular operation as the tool wears or cutting conditions are changed. First, if the chip or work surface just below the cutting edge is bright red, or appears to melt, or burn, the flowrate and/or pressure of the cryo-fluid should be increased. Second, if the tool nose or the perimeter of the chip contact area on the rake surface is cherry-red, there is no need to increase the flowrate and/or pressure of the cryo-fluid unless the frosted coating on the tool starts to shrink. Third, if the tool nose or the perimeter of the chip contact area on the rake is intensely bright red, the flowrate and/or pressure of the cryogenic fluid should be increased regardless of the condition of the frosted coating on tool surface. An occasional local temperature increase at the work/tool contact area may indicate geometric or compositional inhomogeneities of the work material, and can be easily quenched by increasing the flowrate of the cryogenic fluid within the prescribed range of 0.5 to 5.0 lbs/minute to the point at which the whole contact zone, not just the tool surface, is cooled in a direct cryogenic fluid impingement mode.

A cutting tool cryo-cooling operation carried out according to the above guidelines will provide for improved results. It was surprising and unexpected to Applicants that their cryogenic fluid cooling method resulted in an improved fracture resistance of brittle cutting tools during cutting, an improved life of tools engaged in high-energy cutting, and improved surface of machined work material, mirror-clean chips, and a practical, low-cost process control method based on visual observation of the frost coating and the tool nose during cutting. These improved results were surprising and unexpected to Applicants and would be surprising and unexpected to other persons skilled in the art.

One of the basic technical problems with the transfer of compressed cryogenic fluids and discharging of free-expanding jets of cryogenic fluid is a tendency for pulsing and boiling flow instabilities, especially if flowrates fall below 1.1 lbs/minute, which overlaps the lower range of flowrates required by Applicants' method. Since the pulsing flow problem would significantly limit industrial applications of cryogenic fluids, a number of more or less effective flow-stabilizing systems have been developed which include a combination of cryogenic subcooling below the temperature of equilibrium vapor and venting vapor formed in transfer lines.

Some more recent examples of such flow-stabilizing systems are disclosed in U.S. Pat. No. 5,392,608 (Lee), U.S. Pat. No. 5,123,250 (Maric), U.S. Pat. No. 4,716,738 (Tatge), U.S. Pat. No. 4,510,760 (Wieland), and U.S. Pat. No. 4,296,610 (Davis). A method of stabilizing a low-flowrate cryogenic fluid flow in industrial machining and cutting applications was presented by Zurecki and Harriott, "Industrial Systems for Cost Effective Machining of Metals Using an Environmentally Friendly Liquid Nitrogen Coolant", Aerospace Manufacturing Technology Conference, Jun. 2-4, 1998, Long Beach, Calif., Session MP5C, Machining and Machining Processes—Coolants and Process Safety, Paper No. 981,865, and by Zurecki et al., "Dry Machining of Metals With Liquid Nitrogen", the $3^{rd}$ International Machining & Grinding '99 Conference and Exposition, October 4-7, Cincinnati, Ohio, 1999. Since the described systems vary in cost and complexity, it is important to identify the key features determining the effectiveness of a given cryo-fluid flow stabilizing system in high-energy cutting operations.

Applicants discovered that the cycle time of pulsing flow is critical for an effective free-expanding of a cryogenic fluid jet and an effective tool cooling under high-energy conditions.

Figure 3A:
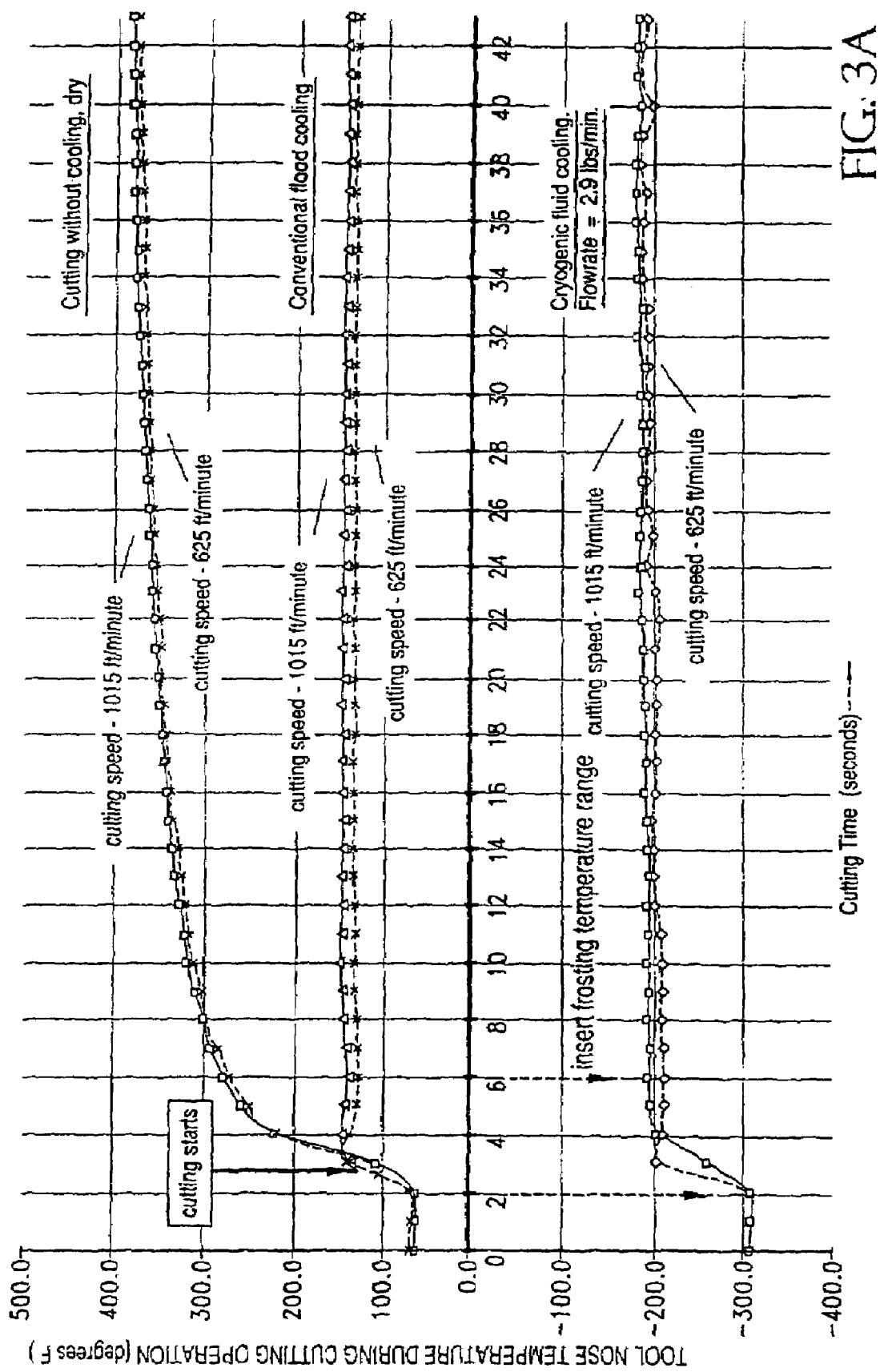
FIG. 3A is a graph illustrating the tool nose temperature over time nose temperature during high-energy turning of stainless steel 440C.

FIG. 3A shows a change in the temperature of a hard WC-Co cutting insert during high-energy turning of stainless steel (grade 440C) without cooling, i.e., dry, with conventional emulsion flood cooling, and with liquid nitrogen cooling applied according to the present invention. The high-energy turning was at a depth of cut of 0.025 inches and a feedrate of 0.010 in/rev. using a carbide insert tool described as follows: CNMG-432, PVD-coated, ISO: M01-M20 (K01-K20), Industry Code: C-3. The cryogenic fluid jet is turned on a few seconds before the cutting tool begins cutting, i.e., contacting the workpiece and making chips. Such a "cooldown" time is sufficient to pre-quench the most typical tools or inserts to cryogenic temperatures required to practice the invention. The cryogenic stream used in this test was stabilized using a slight subcooling, and the resulting jet was steady, with no perceptible pulsation intervals or flowrate amplitude changes.

Based on experiments with cryo-fluid cooling of cutting tools in high-energy cutting operations, a jet pulsation amplitude of more than 25% of the time-averaged flowrate is both easily detectable and significant for the outcome of cooling. A jet pulsing with an amplitude of less than 25% of its time-averaged flowrate can be considered a stable jet for all practical purposes. Temperatures shown in FIG. 3A were recorded with a micro-thermocouple tip located 1.41 mm behind the cutting edge and 1.41 mm below the rake surface, inside the insert nose next to the cutting edge. In all three machining operations noted in FIG. 3A, the time delay between the start of the cut and the wave of the heat diffusing from the edge and arriving at the thermocouple tip was from one to two seconds. After this delay, the temperature stabilized at its own characteristic level reflecting the effectiveness of tool cooling: minus 200° F. (−200° F.=−129° C.) for the liquid nitrogen jet cooling, plus 150° F. (+150° F=+65° C.) for the conventional flood cooling, and more than plus 300OF (+300° F.=+149° C.) for the dry cutting. The continuous climbing of the temperature in the case of dry cutting reflected a progressive heat accumulation and wearing of the cutting tool leading to an increasing cutting power flux entering the tool.

Figure 3B:
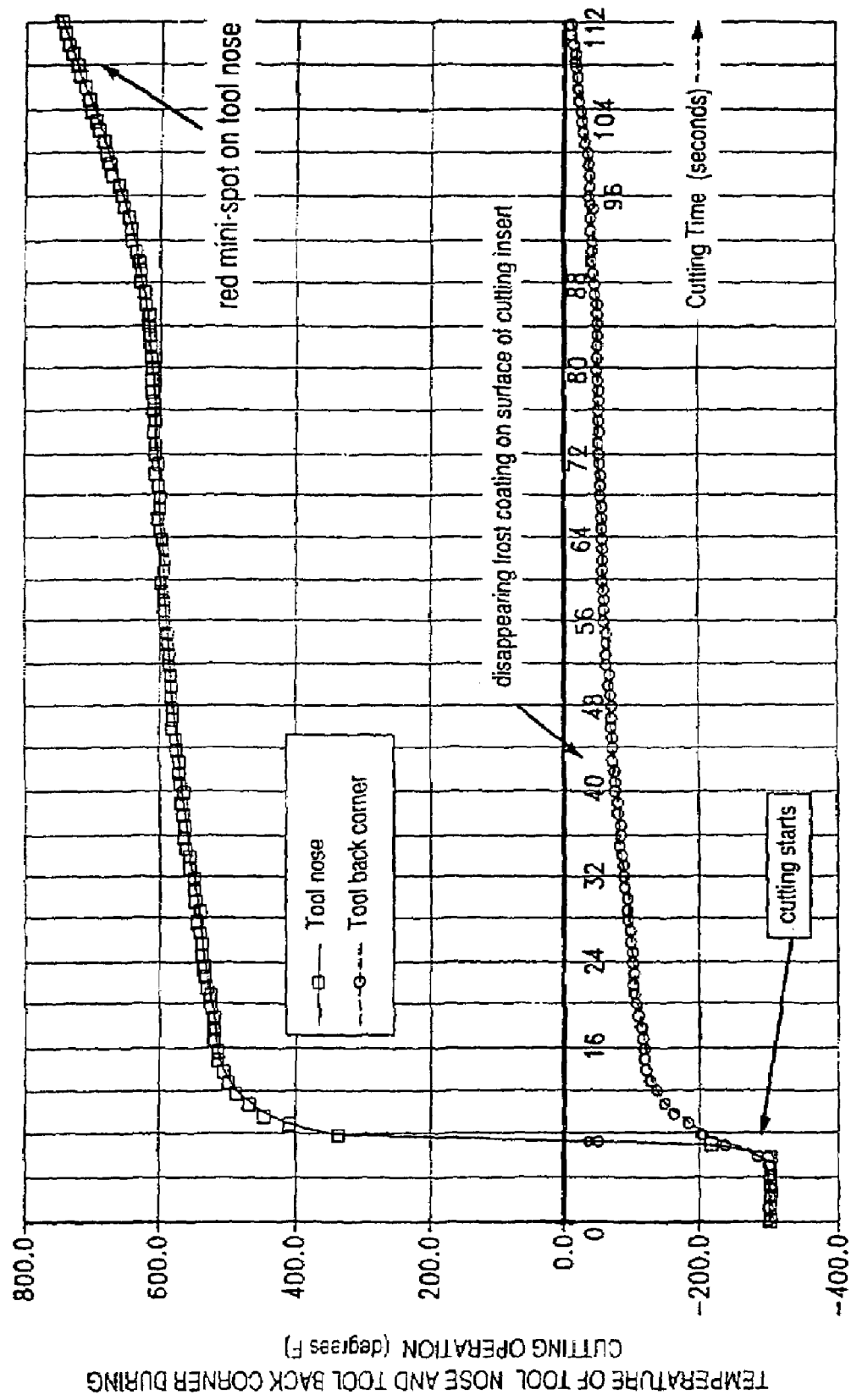
FIG. 3D is a graph illustrating the effect of the RPM of a cutter on impact flowrate of pulsing cryo-fluid reaching a cutting insert.

FIG. 3B shows the change overtime in the temperature of the nose of the front-end of an insert (next to the cutting edge) and in the temperature of the back corner of the insert during high-energy turning of Ti-6Al-4V ELI. The type of insert used in FIG. 3B is the same as in FIG. 3A, but the cutting conditions are much heavier, and the flowrate of liquid nitrogen applied for cooling is less than required in Applicants' method. The high-energy turning in this case (FIG. 3B) was at a depth of cut of 0.120 inches, a feed rate of 0.010 in/rev., and a cutting speed of 230 ft./minute. After a few seconds from the start of cutting, the frost coating on the insert shrinks and starts to completely disappear from its walls, while the nose of the front-end heats up to the point of emitting red light. The deficient cooling and thermal imbalance result in a rapid wear of this insert.

Figure 3C:
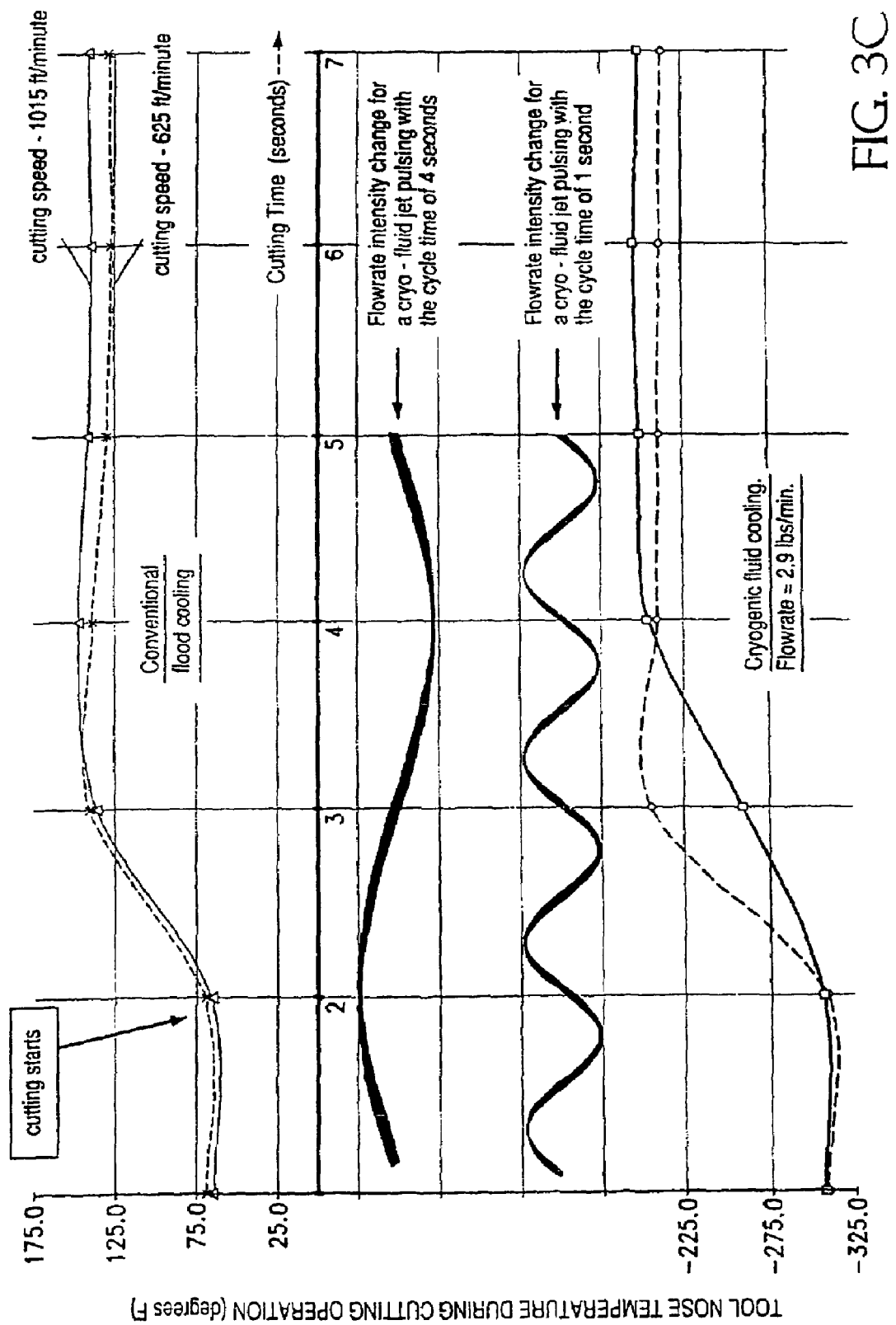

FIG. 3C shows a magnification of the initial, non-steady-state portion of the temperature plots from FIG. 3A. More specifically, FIG. 3C shows the correlation between cryo-fluid pulse cycle and tool nose temperature in high-energy turning of stainless steel (grade 440C). Two different pulsing flow profiles are superimposed on this graph to show the effect of frequency and phase shift on insert cooling during the first seconds of cutting. If the cryogenic fluid pulse cycle time is short compared to the 1-2 second delay in the heating of the nose of the frond-end, the insert material is "unable to sense" the pulsation and behaves as if the insert material was cooled by a steady jet impacting the tool with a time-averaged flowrate. If a cryogenic fluid pulse cycle time is long compared to the 1-2 second time delay, the insert material may be temporarily undercooled or overcooled depending on the phase shift between the jet amplitude and the start-up delay interval. The former results in a dangerous overshooting of the temperature of the nose of the front-end leading to a steep temperature excursion, as shown in FIG. 3B, and to a rapid tool wear. Since the synchronization of the jet pulse phase with the delay interval is impractical and difficult under industrial cutting conditions, the best practical solution is to use a cryo-fluid jet that does not pulse at all or has been stabilized enough to pulse with the cycle time shorter than the start-up delay of a given tool.

Table 4 below details the high-energy cutting conditions used during the tests plotted in FIGS. 3A, 3B and 3C.

TABLE 4

EVALUATION OF MACHINING CONDITIONS IN TEST EXAMPLES PRESENTED

| Work Material | Work Material Hardness | Tool Type and Material | Depth of cut, DOC [inches] | Feed-rate, F [inch/rev] | Cutting Speed Recommended for Selected Feedrate, Med. Value, Vc-x [feet/min] | Actual Cutting Speed Used in Test, Vc [feet/min] | Work Material Removal Rate, MRR [in3/min] | Assumed: Unit Power in Cutting Pc [hp/in3/min] | Unit Energy in Cutting Ec [Joules/mm3] | Total Power, P [hp] | Power Flux, Pf [kW/mm2] |
|---|---|---|---|---|---|---|---|---|---|---|---|
| Stainless steel, 440C grade | 25 HRC | indexable carbide, C-3, Sandvik GC1015-1025 | 0.025 | 0.010 | 410 | — | 1.2 | 1.0 | 2.7 | 1.2 | 5.7 |
| Stainless steel, 440C grade | 25 HRC | indexable carbide, C-3, Sandvik GC1015-1025 | 0.025 | 0.010 | — | 625 | 1.9 | 1.0 | 2.7 | 1.9 | 8.7 |
| Stainless steel, 440C grade | 25 HRC | indexable carbide, C-3, Sandvik GC1015-1025 | 0.025 | 0.010 | — | 1015 | 3.0 | 1.0 | 2.7 | 3.0 | 14.1 |
| Ti-6Al-4V ELI alloy | 32 HRC | indexable carbide, C-3, Sandvik GC1015-1025 | 0.120 | 0.010 | 165 | — | 2.4 | 1.8 | 4.9 | 4.3 | 4.1 |
| Ti-6Al-4V ELI alloy | 32 HRC | indexable carbide, C-3, Sandvik GC1015-1025 | 0.120 | 0.010 | — | 230 | 3.3 | 1.8 | 4.9 | 6.0 | 5.7 |
| Ti-6Al-4V ELI alloy | 32 HRC | indexable carbide, C-3, Sandvik GC1015-1025 | 0.030 | 0.008 | 150 | — | 0.4 | 1.8 | 4.9 | 0.8 | 3.7 |
| Ti-6Al-4V ELI alloy | 32 HRC | indexable carbide, C-3, Sandvik GC1015-1025 | 0.030 | 0.008 | — | 750 | 2.2 | 1.8 | 4.9 | 3.9 | 18.7 |
| Hardened tool steel, A2-grade | 62 HRC | indexable ceramic composite Al2O3-SiCw, Sandvik CC670 | 0.020 | 0.005 | 365 | — | 0.4 | 3.8 | 10.2 | 1.6 | 19.0 |
| Hardened tool steel, A2-grade | 62 HRC | indexable ceramic composite Al2O3-SiCw, Sandvik CC670 | 0.020 | 0.005 | — | 300 | 0.4 | 3.8 | 10.2 | 1.4 | 15.6 |
| Hardened tool steel, A2-grade | 62 HRC | indexable ceramic composite Al2O3-SiCw, Sandvik CC670 | 0.020 | 0.005 | — | 400 | 0.5 | 3.8 | 10.2 | 1.8 | 20.8 |
| Hardened tool steel, A2-grade | 62 HRC | indexable PCBN (low-content CBN), Sumitomo BN300 | 0.020 | 0.004 | 325 | — | 0.3 | 3.8 | 10.2 | 1.2 | 16.9 |
| Hardened tool steel, A2-grade | 62 HRC | indexable PCBN (low-content CBN), Sumitomo BN300 | 0.020 | 0.004 | — | 500 | 0.5 | 3.8 | 10.2 | 1.8 | 26.0 |

Figure 3D:
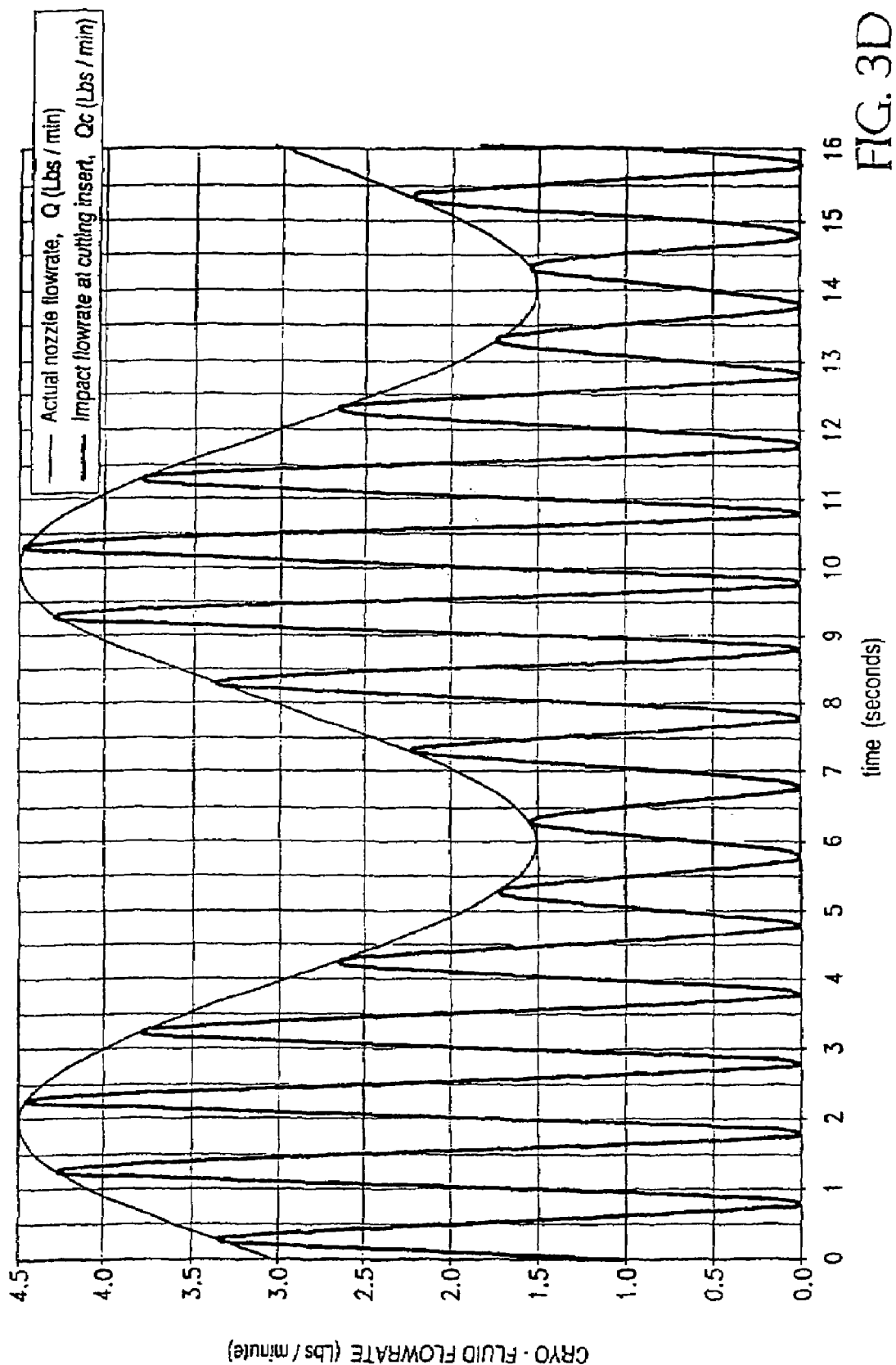

Power Flux = Total Power/DOC/F
NOTES:
CUTTING POWER, POWER FLUX, AND VELOCITY INDEX ARE ESTIMATED FROM DATA IN TABLE 1.
REFERENCES FOR MACHINING CONDITIONS - SANDVIK COROMANT AND SUMITOMO FIG. 3D illustrates the effect of pulse jet cooling in the case of a rotating tool like the milling cutter illustrated in FIG. 3B. More specifically, FIG. 3D shows the effect of the RPM of a cutter on impact flowrate of the pulsing cryogenic fluid reaching the cutting insert under the following conditions: 8.0 seconds cryo-fluid jet cycle time and 60 RPM cutter, 0.4 radian phase shift between jet and cutter, average jet flowrate—3.0 lbs/min., jet flowrate deviation=±50%, and average impact flowrate=1.5 lbs/minute. Since industrial mill cutters operate at high rotational speeds (rpm) with the rotational frequency typically ranging from 1 Hz to 700 Hz, the pulsing jet flow cycle time of about 8 seconds (0.125 Hz) is sliced into short sections which are "invisible" to the rotating cutting edge. In effect, the tool behaves as if it was cooled by the cryo-fluid jet that pulses at its original, "low" frequency but impacts the tool with the flowrate reduced by the effect of rpm superimposed on the lower, time-averaged flowrate of the pulsing jet. This drop in the impact flowrate of the cryo-fluid could be compensated for by increasing the average discharge flowrate of the jet at the nozzle. The practical significance of this example is that no flowrate adjustment could compensate for an excessively long jet pulsing cycle time. Based on the available data, Applicants believe that there exists a limiting value for the jet pulse cycle time (or frequency) and that a non-steady cryogenic fluid jet which pulses slower than the limiting value would be an ineffective coolant for high-energy cutting operations regardless of the time-average flowrate.

The time interval of one to two seconds required to reach a steady-state condition within the front cutting portion of the hard WC-6Co carbide insert, as shown in FIGS. 3A and 3B, is in line with the experimental and numerical determination of J. Lin et al., "Estimation of Cutting Temperature in High Speed Machining", Trans. of the ASME, Vol. 114, July 1992, pp. 289-296. Its value is the limiting pulse cycle time value required for an effective cryogenic fluid cooling of, specifically, harder grades of carbide tools engaged in high-energy cutting operations. Since its value scales with the thermal diffusivity of tool material, Applicants evaluated it for a range of hard but brittle tools which are preferred in high-energy cutting operations. See Table 5 below.

Due to a relatively low diffusivity as compared to the carbide tool, $Al_2O_3$-based and low-content PCBN tools were found to carry out the heat from the cutting edge about 2.5 to 5 times slower. Thus, for the one to two second-long time delay recorded in FIG. 3A, the $Al_2O_3$ time delay will range from about 5 to 10 seconds. This is in line with the numerical estimation of A. Kabala for ceramic inserts, "Heat Transfer in Cutting Inserts", Experimental Stress Analysis 2001, the 39th International Conf., Jun. 4-6, 2001, Tabor, Czech Republic, and sets the limiting value for the maximum pulse cycle time of 10 seconds. Because of very high power fluxes ($P_f$) entering cutting tools through the contact zone in high-energy cutting operations, as shown in Tables 3 and 4, a fluctuation in tool cooling exceeding the limiting pulse cycle time of 10 seconds would lead to a premature tool failure. Consequently, the free-expanding cryo-fluid jets used in high-energy cutting should be sufficiently stabilized during the transfer from the source tank to the nozzle to pulse at a cycle time of less than 10 seconds whenever the pulse amplitude exceeds 25% of the time-averaged flowrate.

EXAMPLES

Figure 4:
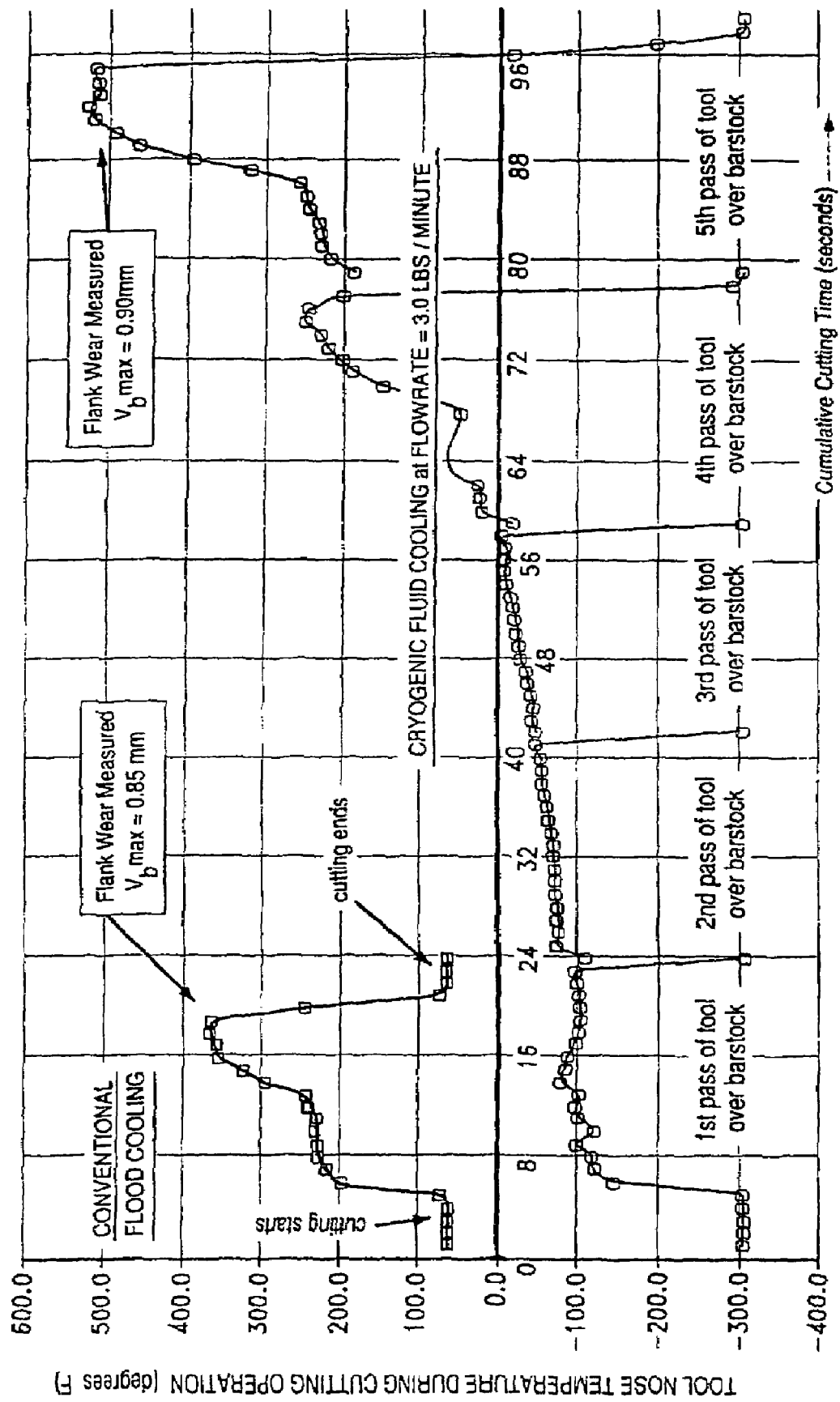
FIG. 4 is a graph illustrating tool life and temperature in high-energy cutting of Ti-6Al-4V.

FIG. 4 shows an evolution of insert temperature and flank wear during a high-energy finish-turning test cutting Ti-6Al-4V with a hard grade of WC-Co insert. The depth of cut was 0.030 inches at a cutting speed of 750 ft./min. and a feed rate of 0.008 in./rev. using the same type of insert as that used in FIG. 4A. The life of a tool cooled with a cryogenic nitrogen jet applied according to the invention was more than four (4) times longer than the life of a tool cooled using a conventional (emulsified) flood coolant.

Figure 5A:
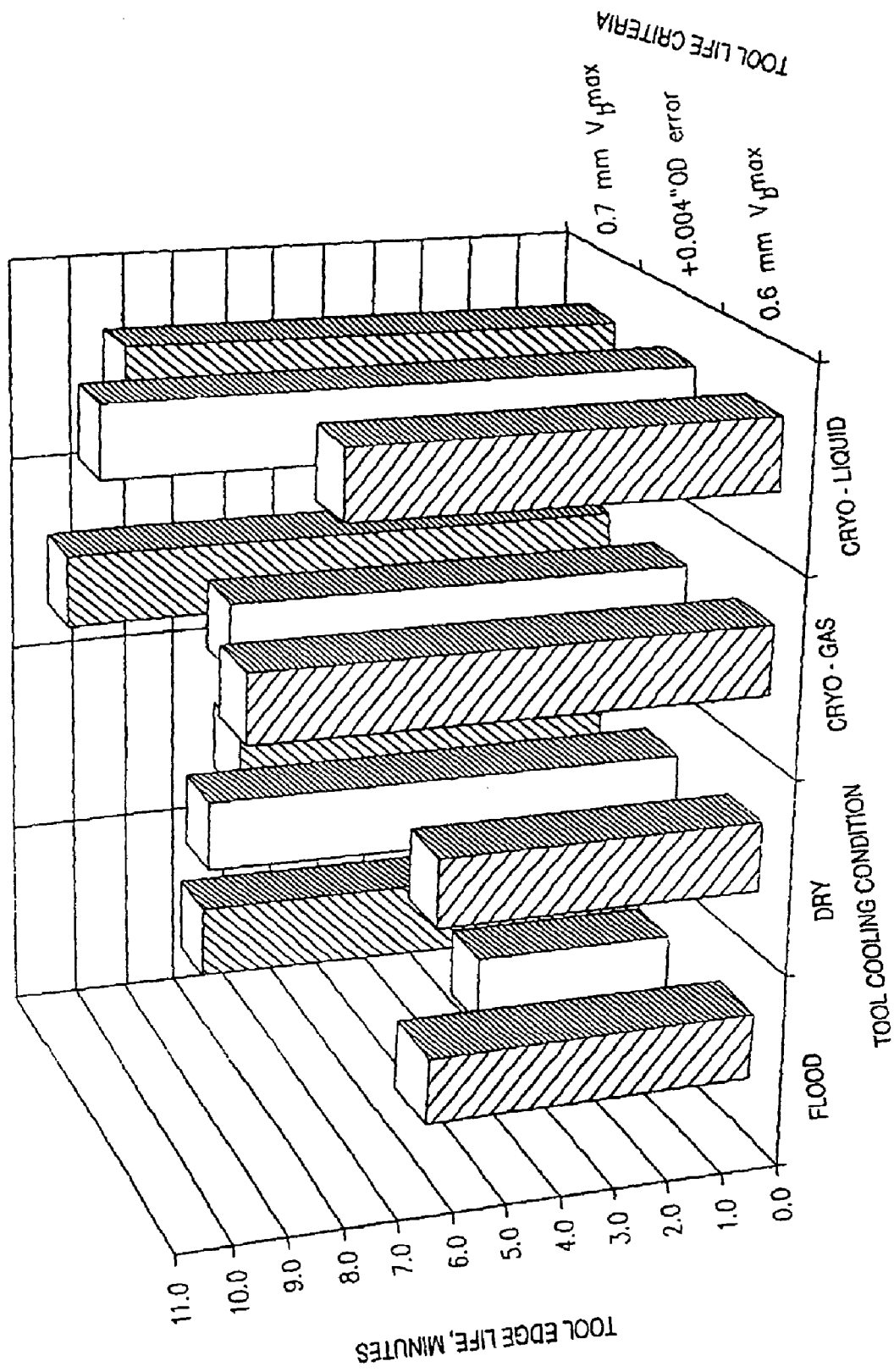
FIG. 5A is a graph illustrating the life of a ceramic composite tool used in a high-energy cutting operation at the speed of 300 ft/minute.

FIG. 5A shows the life of a ceramic composite tool ($Al_2O_3$—$SiC_w$) in a high-energy cutting operation on A2-steel at a speed of 300 ft/minute, a depth of cut of 0.020 inches, a feedrate of 0.005 inches/rev., and a removal rate of 0.36 in.$^3$/min. The tool life was evaluated using three criteria: the maximum flank wear, $V_{b\ max}$=0.6 mm; the maximum flank (or DOC notch) wear, $V_{b\ max}$=0.7 mm; and the dimensional cutting error producing parts 0.004 inches (0.1 mm) larger than required. Four different cutting methods were

TABLE 5

TIME REQUIRED TO REACH STEADYSTATE TEMPERATURE ON TOOL
RAKE SURFACE BASED ON TEST DATA FOR WC-Co INSERT[(4)]

| | source data: | | | calculated: | Tool time to steady-state |
|---|---|---|---|---|---|
| Tool Material | Density g/cm^3 | Specific heat (Cp) J/(kg K) | Thermal conductivity W/(m K) | Thermal diffusivity m^2/sec. | relative to WC-6Co tool t (tool material)/t (WC-6Co) where: L (material) = L (WC-Co) |
| WC-6Co | 14.7 | 230 | 100 | 3.0E−05 | 1.0 |
| 90% PCBN | 3.4 | 810 | 100 | 3.6E−05 | 0.8 |
| 50% PCBN | 4.3 | 810 | 44 | 1.3E−05 | 2.3 |
| Sl3N4 | 3.4 | 170 | 40 | 6.9E−05 | 0.4 |
| Al2O3 | 3.9 | 770 | 18 | 6.0E−06 | 4.9 | assumed constant values at room temperature $t = L^2 \cdot \rho \cdot C_p \cdot \lambda^{-1}$ where:

t = time to reach steady-state temperature at the distance L from the undeformed chip imprint at the rake surface of a cutting tool
ρ = specific density of tool material
$C_p$ = specific heat of tool material
λ = thermal conductivity of tool material used: (1) a conventional emulsion flood, (2) a conventional dry, (3) a cryogenic gas-jet applied according to the invention, and (4) a cryogenic liquid-jet, also applied according to the invention. The conditions for (1), (3) and (4) were as follows: (1) a uniformly flowing and completely flooding conventional cutting fluid, 10% concentration; (3) a stable, non-pulsing gas-phase cryogenic jet flowing at 1.8 lbs/minute, nozzle discharge temperature of minus 150° C. at 7.8 atm (115 psig) pressure; and (4) a stable, non-pulsing liquid-phase cryogenic jet containing a minute fraction of vapor, total flowrate of 0.9 lbs/minute, nozzle discharge temperature of minus 172° C. at 8.1 atm (120 psig). The results point out that the cryo-fluid cooling applied according to the invention extended tool life over the two conventional methods.

Figure 5B:
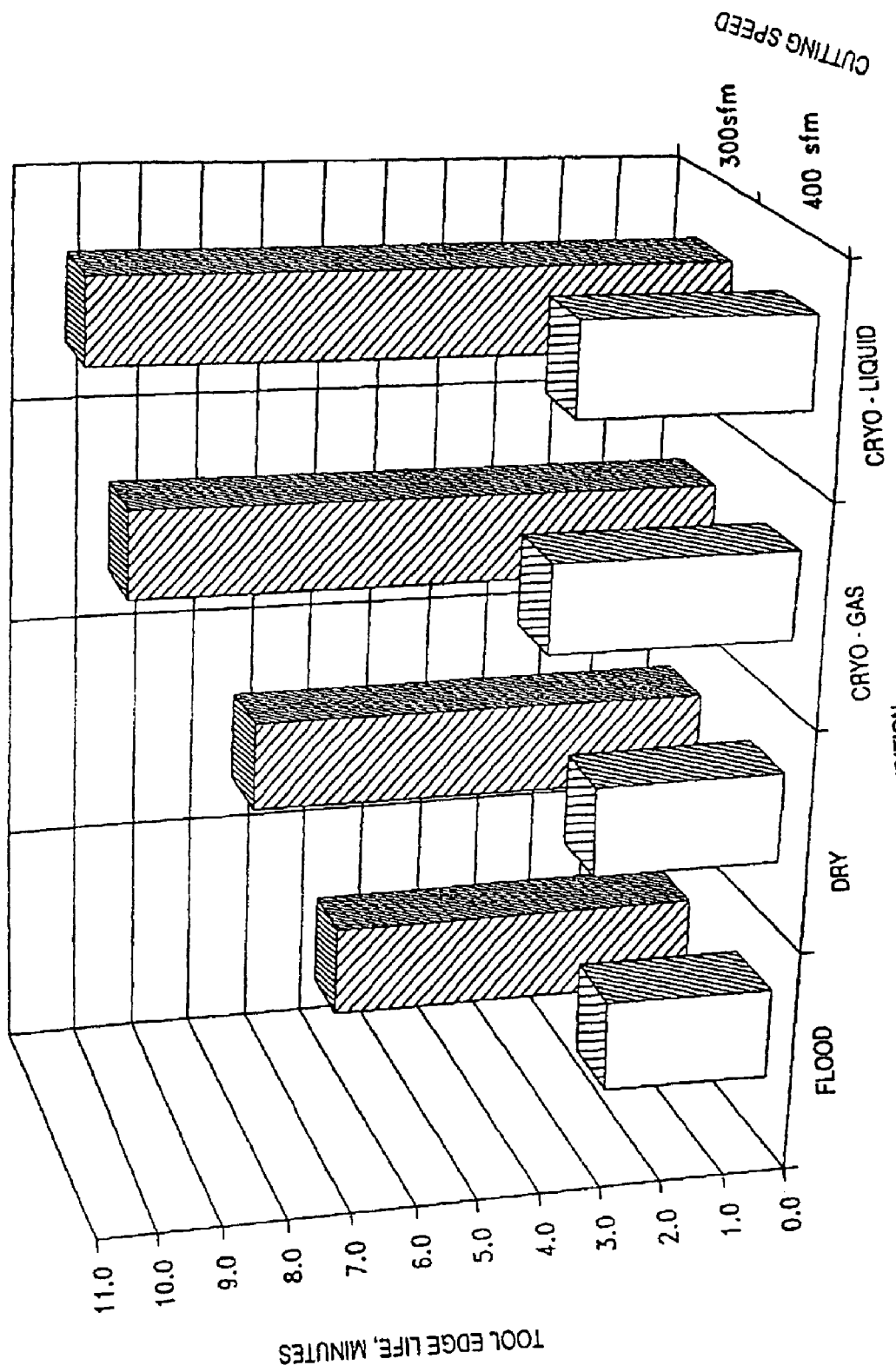
FIG. 5B is a graph illustrating the life of a ceramic composite tool used in a high-energy cutting operation at the speeds of 300 ft/minute and 400 ft/minute.

FIG. 5B shows the life of the same type of tool in the same type of test (as in FIG. 5A) at two cutting speeds of 300 ft/min. (with a material removal rate of 0.36 in$^3$/min) and 400 ft/min. (with a material removal rate of 0.48 in$^3$/min.), where the life in minutes is a composite, averaged from the life measurements according to the same three criteria as above for FIG. 5A. Again, the cryo-fluid cooling applied according to the invention enhanced tool life during this hardturning test under both cutting speeds.

Figure 6:
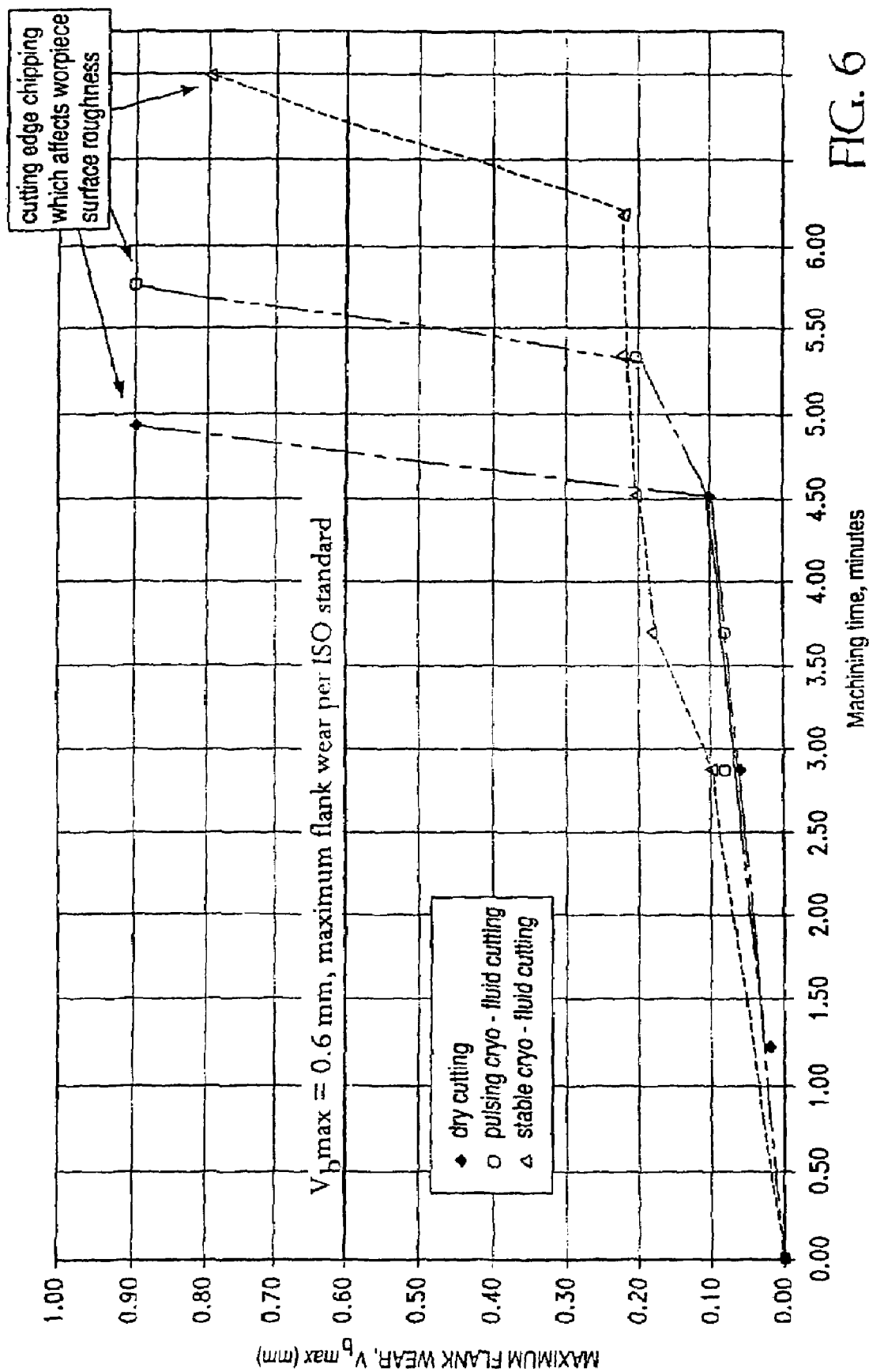
FIG. 6 is a graph illustrating the effect of pulsing cryo-fluid jet on the life of cubic boron nitride under certain conditions.
Figure 7:
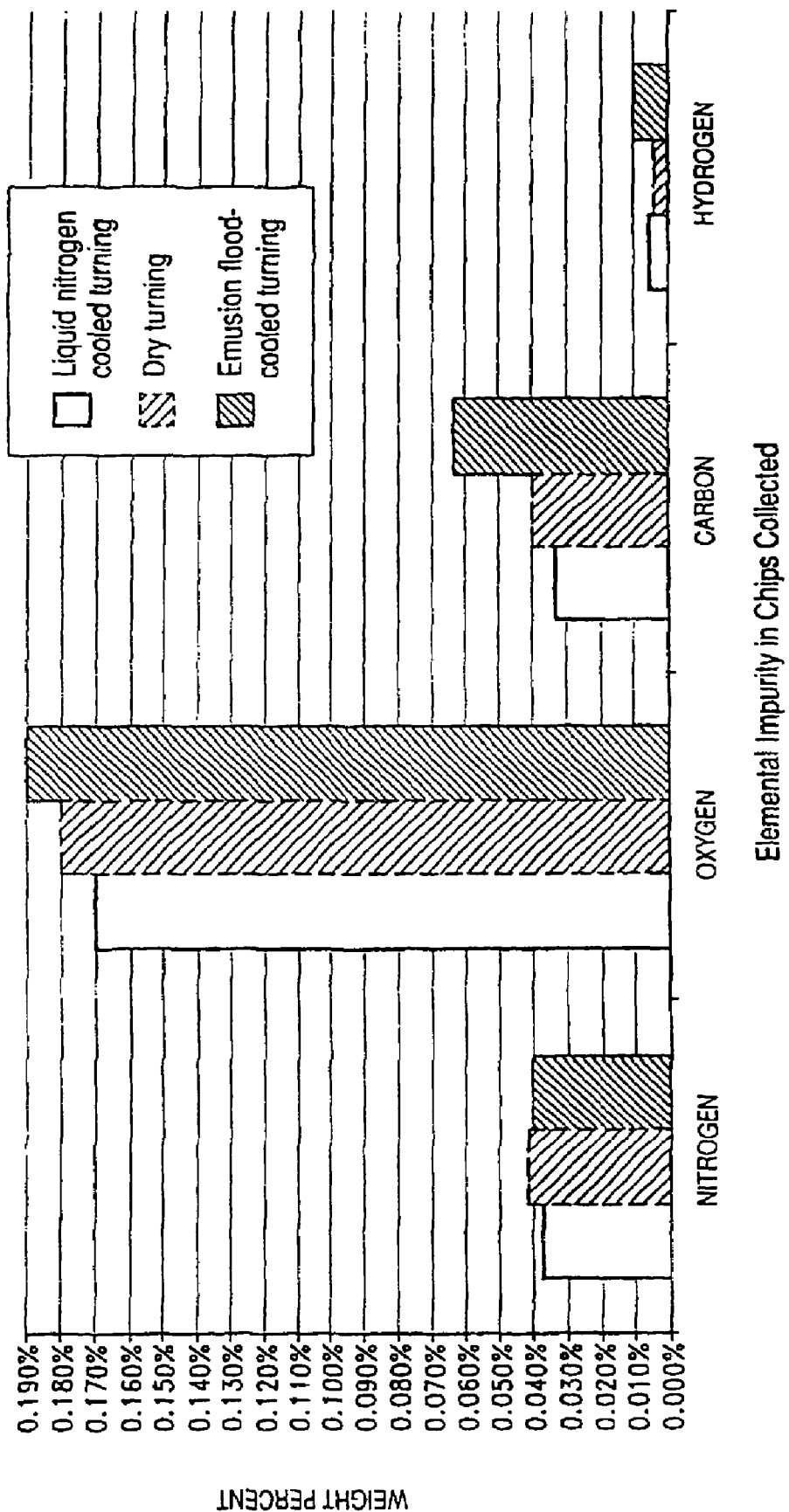
FIG. 7 is a graph illustrating the effect of the invention on the chemistry of chips collected for a Ti-6Al-4V work material.

FIG. 6 shows an evolution of flank wear and cutting edge chipping during hardturning of A2-steel with low-PCBN content (BN-300), brazed-tip insert tools at the speed of 500 ft./minute, a depth of cut of 0.020 inches, a feedrate of 0.004 inches/rev., and a removal rate of 0.48 in.$^3$/min. Three cutting conditions were compared: (1) dry turning, (2) cryogenic liquid jet cooled turning, where the jet was insufficiently stabilized and pulsed at the frequency of 6 seconds, and (3) cryogenic liquid jet cooled turning, where the jet was completely stabilized and showed no pulses or flow instabilities. The conditions for (2) and (3) were as follows: (2) liquid-phase cryogenic jet containing a significant volumetric fraction of vapor, total flowrate of 2.0 lbs/minute, nozzle discharge temperature of minus 169° C. at 10.2 atm (150 psig) pressure, 6-sec. cycle; and (3) liquid-phase cryogenic jet containing an insignificant volumetric fraction of vapor, total flowrate of 2.0 lbs/minute, nozzle discharge temperature of minus 169° C. at 10.2 atm (150 psig) pressure. The ISO tool life criterion of maximum flank wear ($V_{bmax}$) to 0.6 mm was adopted in this test. The shortest cutting edge life was noted for the conventional dry cutting. The life with the pulsing jet was longer, but the longest tool life was noted for the stable, non-pulsing jet.

Table 4, which was discussed earlier, details the high-energy cutting conditions used during the tests plotted in FIGS. 4 to 6 and compares the cutting speeds and power fluxes to the respective values recommended by the manufacturers of the tested inserts.

An additional milling test was carried out to correlate tool frosting and jet pulsing with tool performance in high-energy cutting. The milling cutter used in this test was a ¾ inch (19.05 mm) diameter, 45o helix, 5-flute, high-performance carbide (WC—Co) end-mill, S545-type, made by Niagara Cutter (http://www.niagaracutter.com/techinfo) for maximum metal removal rates during machining of Ti-alloys and other difficult to machine materials. The recommended speeds and feeds for this tool were 90 to 160 ft/minute (27.4 to 48.8 m/minute) and 0.002 inches/tooth (0.05 mm/tooth), respectively. The following accelerated cutting conditions were selected for the conventional milling operation with this cutter using an emulsified cutting fluid (water with "soluble" lubricant): cutting speed—178 ft/minute, rotational speed—907 rpm, feed per tooth—0.003 inches, table feed—13.6 inches/minute, width of cut—0.080 inches, axial depth of cut—1.000 inches, material removal rate—1.09 in$^3$/minute. Under these cutting conditions, all 5 cutter edges were terminally worn after removing of 13.1 in$^3$ of a Ti-6Al-4V workpiece characterized by a hardness of 36 HRC.

In a comparative test, a liquid nitrogen jet discharged from a pressure of 80 psig at the time-averaged flowrate of 2 lbs/minute was directed at the cutter from the distance of 0.5 inches between the exit of a remote nozzle and the corners of the flutes of the end-mill as shown in FIG. 3B. As a result, the jet impinged on all five flutes and rake surfaces of the cutter. Initially, the jet flow was delivered via an insulated line from a saturated liquid nitrogen cylinder in an unstabilized condition, and the jet pulse cycle was found to be about 15 seconds. During the pulse cycle, the low flowrate was estimated at 0.75 lbs/minute, and the high flowrate at 3.25 lbs/minute. It was observed that the cutter could not develop a white frost coating at the surfaces which were unwetted by the impacting cryo-fluid jet for at least a minute after start-up, and once that coating was established, it was unstable, appearing and disappearing, following the jet pulse cycle with some delay. The life of the tool cooled with this non-stable jet and tested with the conditions used above was comparable to that of the conventionally cooled tool.

In another comparative test, the liquid nitrogen flowrate was stabilized using an upstream, liquid nitrogen subcooling system, so that no jet pulsation could be visually detected. The milling operation was repeated using progressively increasing cutting speeds.

It was observed that the frost coating was stable throughout the entire operation. When the cutting speed, table feedrate, rpm, and material removal rate were increased by 60% over the The results show that the chips produced during the cryo-fluid cutting can be more easily recycled than in the case of the conventional cutting methods. This is a significant economic benefit in the machining industry, especially in the case of expensive and reactive titanium, tantalum and superalloy work parts, since the purification of these materials is extremely difficult and expensive. More importantly, the lower contamination of the chips collected indicates a correspondingly lower contamination of the work material, which is desired from the standpoint of (1) part stress distribution, (2) corrosion resistance, and (3) post-machining processability. It is known that the surface of metallic parts characterized by reduced oxygen, carbon, and hydrogen contamination would be more resistant to fatigue cracking in service, less brittle, and more corrosion resistant. Thus, the use of Applicants' free-expanding stabilized cryo-fluid jet cooling method brings about two additional economic benefits to the machining industry—improved properties of parts produced and more valuable, recyclable chips.

Applicants discovered that if a cutting tool insert is cooled with a free-expanding, cryogenic fluid jet discharged from a remote nozzle located away from the cutting zone, the inherent flow instabilities or pulsation of such a jet may unexpectedly interact with the cutting process, affect insert cooling during operation, and reduce its life. Applicants established and optimized cryo-fluid jetting flowrate and stabilizing conditions in order to minimize this problem. None of these findings and inventive techniques could be anticipated from the prior art.

With the free-expanding cryo-fluid jet, stabilized according to the method outlined above, Applicants tried to use the stabilized jet for cooling of hard but brittle tools preferred in high-energy cutting operations, such as a high-speed machining, hardturning, or cutting of difficult to machine materials in order to enhance tool life under demanding machining conditions. Unexpectedly, the remote and stabilized jet cooling resulted in the enhancement of tool life even in the case of those tools which, according to prior art and machining publications, should not be cooled with conventional coolants in order to prevent brittle fracturing.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

ENDNOTES:
(1) Data compiled and calculated from: "*Machining Data Handbook*," $3^{rd}$ Edition, Vol. 2, Machinability DataCenter, Institute of Advanced Manufacturing Sciences, Inc., 1980, p. 17-10, ASM Handbook, $9^{th}$Ed., Vol. 16, "*Machining*, "1995, p. 15, "*Application of Metal Cutting Theory*,"F.E. Gorczyca, Industrial Press, New York, 1987, and "Analysis of Material Removal Processes,"W.R. DeVries, Springer Texts in Mechanical Eng., Springer-Verlag, 1992.
(2) Data compiled from: "*Ceramics and Glasses, Engineered Materials Handbook*,"Vol. 4, ASM Int., The Materials Information Soc., 1991, ASM Specialty Handbook, "*Tool Materials*,"Ed. J.R. Davis, 1998, "*Microstructural Effects in Precision Hard Turning*,"Y.K. Chou and C.J. Evans, MED-Vol. 4, Mfg. Sci. and Engr., ASME 1996; and "*Temperature and wear of cutting in high-speed machining of Inconel 710 and Ti6Al-6V-2Sn*,"T. Kitagawa, et al., Wear 202 (1997), Elsevier, pp. 142-148.
(3) "The Leidenfrost phenomenon", F.L. Curzon, Am. J. Phys., 46 (8), Aug. 1978, pp. 825-828, "A boiling heat transfer paradox", G.G. Lavalle et al., Am. J. Phys., vol. 60, No. 7, July 1992, pp.593-597, "Cooling by immersion in liquid nitrogen", T.W. Listerman et al., Am. J. Phys., 54(6), June 1986, pp. 554-558, "An Analytical Method to Determine the Liquid Film Thickness Produced by Gas Atomized Sprays", J. Yang et al., J. of Heat Transfer, Feb. 1996, Vol. 118, pp. 255-258, "Optimizing and Predicting Critical Heat Flux in Spray Cooling of a Square Surface", I. Mudawar and K.A. Estes, J. of Heat Transfer, Aug. 1996, vol. 118, pp. 672-679, and "Film Boiling Under an Impinging Cryogenic Jet", R.F. Barron and R.S. Stanley, Advances in Cryogenic Engineering, Vol. 39, Ed. P. Kittel, Plenum Press, New York, 1994, pp. 1769-1777.
(4) Data compiled from: "*Ceramics and Glasses, Engineered Materials Handbook*,"Vol. 4, ASM Int., The Materials Information Soc., 1991, "CRC Materials Sci. & Engineering Handbook," $2^{nd}$ Edition, CRC Press, 1994, Edited by J.F. Shackelford et al., "Analysis of Material Removal Process,"W.R. DeVries, Springer Tests in Mechanical Engineering, Springer-Verlag 1992,. "*Transport Phenomena*, "R.R. Bird et al., John Wiley & Sons, 1960, "Numerical and Experimental Simulation for Cutting Temperature Estimation using 3-dimensional Inverse Heat Conduction Technique,"F.R.S. Lima et al., "Inverse Problems in Engineering: Theory and Practice," $3^{rd}$ Int. Conf. on Inverse Problems in Engineering, June 13-18, 1999, Port Ludlow, WA, USA, and Kennametal's web page: http://www.kennametal.com/metalworking/html specialty/properties%20 chart.pdf.

The invention claimed is:

1. A method for cooling a cutting tool while the cutting tool is machining a workpiece during high-energy cutting, comprising the steps of:

providing a supply of a cryogenic fluid; and
delivering a free-expanding stabilized jet of the cryogenic fluid from a nozzle to the cutting tool while the cutting tool is machining the workpiece during high-energy cutting,
wherein the free-expanding stabilized jet is expanded from a first pressure into an unconfined surrounding or at a second pressure, the first pressure being greater than the second pressure, and
wherein the free-expanding stabilized jet pulses with a jet pulsation amplitude of less than 25% of a time-averaged flowrate of the free-expanding stabilized jet while the cutting tool is machining the workpiece.

2. A method as in claim 1, wherein the cutting tool has a cutting edge and wherein a means for delivering the free-expanding stabilized jet of the cryogenic fluid to the cutting tool has at least one discharge point spaced apart from the cutting edge by a distance greater than or equal to 0.1 inches and less than 3.0inches.

3. A method as in claim 1, wherein at least a portion of the free-expanding stabilized jet of the cryogenic fluid has a temperature below minus 150 degrees Celsius (−150° C.).

4. A method as in claim 2, wherein at least a portion of the cryogenic fluid has a pressure greater than or equal to 25 psig and less than or equal to 250 psig during or immediately prior to discharge from the at least one discharge point.

5. A method as in claim 1, wherein at least a portion of the free-expanding stabilized jet of the cryogenic fluid has a substantially uniform mass flowrate greater than or equal to 0.5 lbs/minute and less than or equal to 5.0 lbs/minute.

6. A method as in claim 1, wherein at least a portion of the free-expanding stabilized jet of the cryogenic fluid has a flow pulse cycle time less than 10 seconds if the jet pulsation amplitude exceeds 25% of the time-averaged flowrate of at least a portion of the free-expanding stabilized jet before or during at least a portion of a time while the cutting tool is machining the workpiece.

7. A method as in claim 1, wherein the cutting tool has a rake surface and at least a portion of the free-expanding stabilized jet of the cryogenic fluid impinges on at least a portion of the rake surface.

8. A method as in claim 1, wherein at least a portion of the cryogenic fluid is selected from a group consisting of liquid nitrogen, gaseous nitrogen, liquid argon, gaseous argon and mixtures thereof.

9. A method as in claim 1, wherein at least a portion of the cutting tool has a traverse rupture strength (TRS) value of less than 3000 MPa.

10. A method for machining a workpiece with a cutting tool using a method for cooling the cutting tool as in claim 1.

11. A workpiece machined by a method for machining the workpiece with a cutting tool, the method for machining using a method for cooling the cutting tool while the cutting tool is machining the workpiece, the method for cooling the cutting tool comprising the steps of:

providing a supply of a cryogenic fluid; and
delivering a free-expanding stabilized jet of the cryogenic fluid from a nozzle to the cutting tool while the cutting tool is machining the workpiece, wherein the free-expanding stabilized jet is expanded from a first pressure into an unconfined surrounding or an open space at a second pressure, the first pressure being greater than the second pressure,
wherein the workpiece is characterized by an improved surface having a much cleaner and shinier as-machined surface with a lower level of at least one of nitrogen, oxygen, carbon, and hydrogen compared to an other as-machined surface of an other workpiece machined by dry cutting or emulsion flood cooling.

12. Recyclable chips obtained as a byproduct of a method for machining the workpiece with a cutting tool, the method for machining using a method for cooling the cutting tool while the cutting tool is machining the workpiece, the method for cooling the cutting tool comprising the steps of:
   providing a supply of a cryogenic fluid; and
   delivering a free-expanding stabilized jet of the cryogenic fluid from a nozzle to the cutting tool while the cutting tool is machining the workpiece, wherein the free-expanding stabilized jet is expanded from a first pressure into an unconfined surrounding or an open space at a second pressure, the first pressure being greater than the second pressure,
   wherein the recyclable chips are characterized by an improved purity having a lower level of at least one of nitrogen, oxygen, carbon, and hydrogen contamination compared to other recyclable chips obtained as an other byproduct of an other method for machining using dry cutting or emulsion flood cooling.

13. A method for cooling a workpiece while the workpiece is being machined by a cutting tool during high-energy cutting, comprising the steps of:
   providing a supply of a cryogenic fluid; and
   delivering a free-expanding stabilized jet of the cryogenic fluid from a nozzle to the workpiece while the workpiece is being machined by the cutting tool during high-energy cutting,
   wherein the free-expanding stabilized jet is expanded from a first pressure into an unconfined surrounding at a second pressure, the first pressure being greater than the second pressure, and
   wherein the free-expanding stabilized jet pulses with a jet pulsation amplitude of less than 25% of a time-averaged flowrate of the free-expanding stabilized jet while the cutting tool is machining the workpiece.

14. A method for controlling cooling of a cutting tool during a high-energy cutting operation, comprising the steps of:
   providing a supply of a cryogenic fluid;
   delivering a free-expanding stabilized jet of the cryogenic fluid to the cutting tool; and
   regulating the flow of the cryogenic fluid to the cutting tool at a substantially uniform mass flowrate, whereby a frost coating is maintained on at least a portion of the cutting tool during substantially all of the high-energy cutting operation in an atmosphere having an ambient relative humidity in a range of 30% to 75% and an ambient temperature in a range of 10° C. to 25° C.,
   wherein the free-expanding stabilized let is expanded from a first pressure into an unconfined surrounding at a second pressure, the first pressure being greater then the second pressure, and
   wherein the free-expanding stabilized jet pulses with a jet pulsation amplitude of less than 25% of a time-averaged flowrate of the free-expanding stabilized jet while the cutting tool is machining the workpiece.

15. A method for machining a workpiece with a cutting tool using a method for controlling cooling of the cutting tool as in claim 14.

16. A workpiece machined by a method for machining the workpiece with a cutting tool, the method for machining using a method for controlling cooling of the cutting tool during a cutting operation, the method for controlling cooling of the cutting tool comprising the steps of:
   providing a supply of a cryogenic fluid;
   delivering a flow of the cryogenic fluid to the cutting tool; and
   regulating the flow of the cryogenic fluid to the cutting tool at a substantially uniform mass flowrate, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C.,
   wherein the workpiece is characterized by an improved surface having a much cleaner and shinier as-machined surface with a lower level of at least one of nitrogen, oxygen, carbon, and hydrogen compared to an other as-machined surface of an other workpiece machined by dry cutting or emulsion flood cooling.

17. Recyclable chips obtained as a byproduct of a method for machining the workpiece with a cutting tool, the method for machining using a method for controlling cooling of the cutting tool during a cutting operation, the method for controlling cooling of the cutting tool comprising the steps of:
   providing a supply of a cryogenic fluid;
   delivering a flow of the cryogenic fluid to the cutting tool; and
   regulating the flow of the cryogenic fluid to the cutting tool at a substantially uniform mass flowrate, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C.,
   wherein the recyclable chips are characterized by an improved purity having a lower level of at least one of nitrogen, oxygen, carbon, and hydrogen contamination compared to other recyclable chips obtained as an other byproduct of an other method for machining using dry cutting or emulsion flood cooling.

18. A method for cooling a cutting tool having a cutting edge while the cutting tool is machining a workpiece during high-energy cutting, comprising the steps of:
   providing a supply of a cryogenic fluid;
   providing a nozzle adapted to discharge a jet of the cryogenic fluid, said nozzle having at least one discharge point spaced apart from the cutting edge by a distance greater than or equal to 0.1 inches and less than 3.0 inches; and
   delivering a free-expanding stabilized jet of the cryogenic fluid from the discharge point to the cutting tool while the cutting tool is machining the workpiece during high-energy cutting,
   wherein the cryogenic fluid has a temperature of minus 150 degrees Celsius (−150° C.) at the discharge point,
   wherein the free-expanding stabilized jet is expanded from a first pressure into an unconfined surrounding at a second pressure, the first pressure being greater than the second pressure, and
   wherein the free-expanding stabilized jet pulses with a jet pulsation amplitude of less than 25% of a time-averaged flowrate of the free-expanding stabilized jet while the cutting tool is machining the workpiece.

19. A method for controlling cooling of a cutting tool during a high-energy cutting operation, comprising the steps of:
   providing a supply of a cryogenic fluid;
   providing a nozzle adapted to discharge a flow of the cryogenic fluid, said nozzle having at least one discharge point spaced apart from the cutting tool;

delivering a free-expanding stabilized jet of the cryogenic fluid from the discharge point to the cutting tool; and regulating the flow of the cryogenic fluid to the cutting tool at a substantially uniform mass flowrate greater than or equal to 0.5 lbs/minute and less than or equal to 5.0 lbs/minute having a flow pulse cycle time less than 10 seconds, whereby a frost coating is maintained on at least a portion of the cutting tool during substantially all of the high-energy cutting operation in an atmosphere having an ambient relative humidity in a range of 30% to 75% and an ambient temperature in a range of 10° C. to 25° C., wherein the free-expanding stabilized jet is expanded from a first pressure into an unconfined surrounding at a second pressure, the first pressure being greater than the second pressure, and wherein the free-expanding stabilized jet pulses with a jet pulsation amplitude of less than 25% of a time-averaged flowrate of the free-expanding stabilized jet while the cutting tool is machining the workpiece.

20. An apparatus for cooling a cutting tool while the cutting tool is machining a workpiece during high-energy cutting, comprising:

a supply of a cryogenic fluid; and means for delivering a free-expanding stabilized jet of the cryogenic fluid to the cutting tool while the cutting tool is machining the workpiece during high-energy, wherein the free-expanding stabilized jet is expanded from a first pressure into an unconfined surrounding at a second pressure, the first pressure being greater than the second pressure, and wherein the free-expanding stabilized let pulses with a jet pulsation amplitude of less than 25% of a time-averaged flowrate of the free-expanding stabilized jet while the cutting tool is machining the workpiece.

21. An apparatus as in claim 20, wherein the cutting tool has a cutting edge and wherein the means for delivering the free-expanding stabilized jet of the cryogenic fluid to the cutting tool has at least one discharge point spaced apart from the cutting edge by a distance greater than or equal to 0.1 inches and less than 3.0 inches.

22. An apparatus as in claim 20, wherein at least a portion of the free-expanding stabilized jet of the cryogenic fluid has a temperature below minus 150 degrees Celsius (−150° C.).

23. An apparatus as in claim 21, wherein at least a portion of the free-expanding stabilized jet of the cryogenic fluid has a pressure greater than or equal to 25 psig and less than or equal to 250 psig during or immediately prior to discharge from the at least one discharge point.

24. An apparatus as in claim 20, wherein at least a portion of the free-expanding stabilized jet of the cryogenic fluid has a substantially uniform mass flowrate greater than or equal to 0.5 lbs/minute and less than or equal to 5.0 lbs/minute.

25. An apparatus as in claim 20, wherein at least a portion of the free-expanding stabilized jet of the cryogenic fluid has a flow pulse cycle time less than 10 seconds if the jet pulsation amplitude exceeds 25% of the time-averaged flowrate of at least a portion of the free-expanding stabilized jet before or during at least a portion of a time while the cutting tool is machining the workpiece.

26. An apparatus as in claim 20, wherein the cutting tool has a rake surface and at least a portion of the free-expanding stabilized jet of the cryogenic fluid impinges on at least a portion of the rake surface.

27. An apparatus as in claim 20, wherein at least a portion of the cryogenic fluid is selected from a group consisting of liquid nitrogen, gaseous nitrogen, liquid argon, gaseous argon and mixtures thereof.

28. An apparatus as in claim 20, wherein at least a portion of the cutting tool has a traverse rupture strength (TRS) value of less than 3000 MPa.

29. An apparatus for machining a workpiece with a cutting tool using an apparatus for cooling the cutting tool as in claim 20.

30. A workpiece machined by an apparatus for machining the workpiece with a cutting tool, the apparatus for machining using an apparatus for cooling the cutting tool while the cutting tool is machining the workpiece, the apparatus for cooling the cutting tool comprising:

a supply of a cryogenic fluid; and means for delivering a free-expanding stabilized jet of the cryogenic fluid to the cutting tool while the cutting tool is machining the workpiece, wherein the free-expanding stabilized jet is expanded from a first pressure into an unconfined surrounding or an open space at a second pressure, the first pressure being greater than the second pressure, wherein the workpiece is characterized by an improved surface having a much cleaner and shinier as-machined surface with a lower level of at least one of nitrogen, oxygen, carbon, and hydrogen compared to an other as-machined surface of an other workpiece machined by dry cutting or emulsion flood cooling.

31. Recyclable chips removed from a workpiece by an apparatus for machining the workpiece with a cutting tool, the apparatus for machining using an apparatus for cooling the cutting tool while the cutting tool is machining the workpiece, the apparatus for cooling the cutting tool comprising:

a supply of a cryogenic fluid; and means for delivering a free-expanding stabilized jet of the cryogenic fluid to the cutting tool while the cutting tool is machining the workpiece, wherein the free-expanding stabilized jet is expanded from a first pressure into an unconfined surrounding or an open space at a second pressure, the first pressure being greater than the second pressure, wherein the recyclable chips are characterized by an improved purity having a lower level of at least one of nitrogen, oxygen, carbon, and hydrogen contamination compared to other recyclable chips obtained as an other byproduct of an other method for machining using dry cutting or emulsion flood cooling.

32. An apparatus for cooling a workpiece while the workpiece is being machined by a cutting tool during high-energy cutting, comprising:

a supply of a cryogenic fluid; and means for delivering a free-expanding stabilized jet of the cryogenic fluid to the workpiece while the workpiece is being machined by the cutting tool during high-energy cutting, wherein the free-expanding stabilized jet is expanded from a first pressure into an unconfined surrounding at a second pressure, the first pressure being greater than the second pressure, and wherein the free-expanding stabilized jet pulses with a jet pulsation amplitude of less than 25% of a time-averaged flowrate of the free-expanding stabilized jet while the cutting tool is machining the workpiece.

33. An apparatus for controlling cooling of a cutting tool during a high-energy cutting operation, comprising:

a supply of a cryogenic fluid;

means for delivering a free-expanding stabilized jet of the cryogenic fluid to the cutting tool; and means for regulating the flow of the cryogenic fluid to the cutting tool at a substantially uniform mass flowrate, whereby a frost coating is maintained on at least a portion of the cutting tool during substantially all of the high-energy cutting operation in an atmosphere having an ambient relative humidity in a range of 30% to 75% and an ambient temperature in a range of 10° C. to 25° C., wherein the free-expanding stabilized jet is expanded from a first pressure into an unconfined surrounding at a second pressure, the first pressure being greater than the second pressure, and wherein the free-expanding stabilized jet pulses with a jet pulsation amplitude of less than 25% of a time-averaged flowrate of the free-expanding stabilized jet while the cutting tool is machining the workpiece.

34. An apparatus for machining a workpiece with a cutting tool using an apparatus for controlling cooling of the cutting tool as in claim 33.

35. A workpiece machine by an apparatus for machining the workpiece with a cutting tool, the apparatus for machining using an apparatus for controlling cooling of the cutting tool during a cutting operation, the apparatus for controlling cooling of the cutting tool comprising:

a supply of a cryogenic fluid;

means for delivering a flow of the cryogenic fluid to the cutting tool; and means for regulating the flow of the cryogenic fluid to the cutting tool at a substantially uniform mass flowrate, whereby a frost coating is maintained on at least a portion of the cutting tool during substantially all of the cutting operation in an atmosphere having an ambient relative humidity in a range of about 30% to 75% and an ambient temperature in a range of about 10° C. to about 25° C., wherein the workpiece is and characterized by an improved surface having a much cleaner and shinier as-machined surface with a lower level of at least one of nitrogen, oxygen, carbon, and hydrogen compared to an other as-machined surface of an other workpiece machined by dry cutting or emulsion flood cooling.

36. Recyclable chips removed from a workpiece by an apparatus for machining the workpiece with a cutting tool, the apparatus for machining using an apparatus for controlling cooling of the cutting tool during a cutting operation the apparatus for controlling cooling of the cutting tool comprising:

a supply of a cryogenic fluid;

means for delivering a flow of the cryogenic fluid to the cutting tool; and means for regulating the flow of the cryogenic fluid to the cutting tool at a substantially uniform mass flowrate, whereby a frost coating is maintained on at least a portion of the cutting tool during substantially all of the cutting operation in an atmosphere having an ambient relative humidity in a range of about 30% to about 75% and an ambient temperature in a range of about 10° C. to about 25° C., wherein the recyclable chips are characterized by an improved purity having a lower level of at least one of nitrogen, oxygen, carbon, and hydrogen contamination compared to other recyclable chips obtained as an other byproduct of an other method for machining using dry cutting or emulsion flood cooling.

* * * * *

UNITED STATES PATENT AND TRADEMARK OFFICE
CERTIFICATE OF CORRECTION

PATENT NO. : 7,637,187 B2 Page 1 of 1
APPLICATION NO. : 10/488854
DATED : December 29, 2009
INVENTOR(S) : Zurecki et al.

It is certified that error appears in the above-identified patent and that said Letters Patent is hereby corrected as shown below:

On the title page item (75), insert Fourth Inventor -- George Matthew Harriott, Allentown, PA; --

Signed and Sealed this

Ninth Day of March, 2010

David J. Kappos
*Director of the United States Patent and Trademark Office*